United States Patent
Panek et al.

(10) Patent No.: US 12,492,163 B2
(45) Date of Patent: Dec. 9, 2025

(54) 9H-FLUORENE DERIVATIVES OR THEIR PHARMACEUTICALLY ACCEPTABLE SALTS

(71) Applicant: UNIWERSYTET JAGIELLONSKI, Cracow (PL)

(72) Inventors: Dawid Panek, Cracow (PL); Barbara Malawska, Cracow (PL); Anna Pasieka, Cracow (PL); Jakub Jonczyk, Cracow (PL); Anna Wieckowska, Libertow (PL); Justyna Godyn, Cracow (PL); Natalia Szalaj, Cracow (PL); Marek Bajda, Rzeszow (PL); Kinga Salat, Cracow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 589 days.

(21) Appl. No.: 17/907,152

(22) PCT Filed: May 20, 2021

(86) PCT No.: PCT/PL2021/050033
§ 371 (c)(1),
(2) Date: Sep. 23, 2022

(87) PCT Pub. No.: WO2021/235956
PCT Pub. Date: Nov. 25, 2021

(65) Prior Publication Data
US 2023/0117233 A1     Apr. 20, 2023

(30) Foreign Application Priority Data
May 20, 2020 (PL) .......................... 434014

(51) Int. Cl.
| | | |
|---|---|---|
| C07C 215/28 | (2006.01) | |
| A61P 25/08 | (2006.01) | |
| A61P 25/28 | (2006.01) | |
| C07C 233/40 | (2006.01) | |

(52) U.S. Cl.
CPC ............ *C07C 215/28* (2013.01); *A61P 25/28* (2018.01); *C07C 233/40* (2013.01); *C07C 2603/18* (2017.05)

(58) Field of Classification Search
None
See application file for complete search history.

(56) References Cited

U.S. PATENT DOCUMENTS

2021/0347727 A1* 11/2021 Buckman .............. C07D 265/38

FOREIGN PATENT DOCUMENTS

| WO | 2004/024081 A2 | 3/2004 |
| WO | 2005/087751 A2 | 9/2005 |

* cited by examiner

*Primary Examiner* — Po-Chih Chen
(74) *Attorney, Agent, or Firm* — Arrigo, Lee, Guttman & Mouta-Bellum LLP

(57) ABSTRACT

A group of novel 9H-fluorene derivatives suitable for the preparation of active substances for the treatment of Alzheimer's disease, in particular as multifunctional inhibitors of the BuChE and BACE1 enzymes and beta-amyloid aggregation.

8 Claims, 7 Drawing Sheets

9H-FLUORENE DERIVATIVES OR THEIR PHARMACEUTICALLY ACCEPTABLE SALTS

FIELD OF THE INVENTION

The invention relates to novel 9H-fluorene derivatives or their pharmaceutically acceptable salts, which are compounds of multifunctional ligand character with potential effects on Alzheimer's disease.

BACKGROUND OF THE INVENTION

One of the incurable diseases requiring a comprehensive approach is the neurodegenerative Alzheimer's disease (AD). It is characterized by cognitive decline and is the most common chronic, progressive type of dementia. It mainly affects the elderly over 65. Currently, it is estimated that the number of people suffering from dementia worldwide is about 50 million, of which 60-80% are patients with Alzheimer's disease. It is an incurable disease and its pathomechanism has not yet been fully elucidated.

The key neuropathological changes observed in Alzheimer's disease are the formation of extraneuronal aggregates of the β-amyloid (Aβ) peptide and intracellular neurofibrillary tangles produced from over-phosphorylated tau protein, which develop in areas of the brain responsible for memory and cognitive functions. Moreover, the pathomechanism of the disease includes processes such as excitotoxicity, neuroinflammation, mitochondrial damage, oxidative stress, leading to damage to neuronal function, neurotransmission disorders, progressive neurodegeneration and neuronal death, and further dementia.

The multifactorial nature of Alzheimer's disease and its complexity pose a problem in finding effective ways to inhibit or treat it. Currently, only four drugs are used in the treatment of the disease (the last one was approved in 2003) with limited effectiveness, acting only symptomatically in the initial stages of the disease. There are no effective drugs to address its causes.

Thus, there is an urgent need to discover new bioactive molecules and, in the future, a new drug that will act at the basis of AD.

It is particularly desirable to obtain compounds that are multifunctional ligands that would simultaneously affect various currently known mechanisms related to the pathogenesis and course of Alzheimer's disease, in particular compounds allowing the simultaneous inhibition of enzymes: butyrylcholinesterase and β-secretase, and inhibition of β-amyloid aggregation.

BRIEF SUMMARY OF THE INVENTION

The invention relates to compound of formula I:

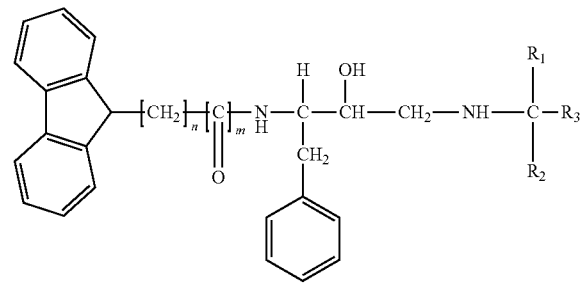

formula I where:
n or m is an integer with value 0 or 1,
$R_1$ is a hydrogen atom or a methyl group,
$R_2$ is a hydrogen atom or a methyl group,
$R_3$ is a hydrogen atom, a methyl, trifluoromethyl, tert-butyl, cyclopropyl, cyclohexyl or phenyl group without a substituent or with a 2-, 3- or 4-methoxy, 2-, 3- or 4-trifluoromethyl, 2-, 3- or 4-isopropyl, or 2-, 3- or 4-tert-butyl substituent, or a pharmaceutically acceptable salt thereof.

Preferably, the compound according to the invention is a compound of formula II:

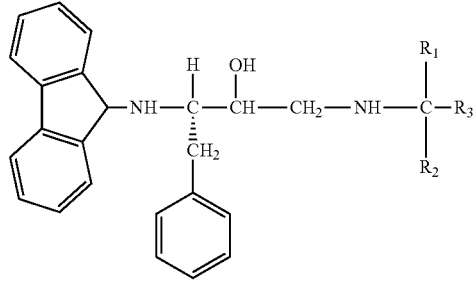

formula II where:
$R_1$, $R_2$ and $R_3$ are the groups defined above.

Preferably, the compound according to the invention is selected from the group comprising:
(2R,3S)-3-((9H-fluoren-9-yl)amino)-1-(benzylamino)-4-phenylbutan-2-ol,
(2S,3S)-3-((9H-fluoren-9-yl)amino)-1-(benzylamino)-4-phenylbutan-2-ol,
(2R,3S)-3-((9H-fluoren-9-yl)amino)-1-((3-(tert-butyl)benzyl)amino)-4-phenylbutan-2-ol,
(2R,3S)-3-((9H-fluoren-9-yl)amino)-1-((3-isopropylbenzyl)amino)-4-phenylbutan-2-ol,
(2S,3S)-3-((9H-fluoren-9-yl)amino)-1-((4-(tert-butyl)benzyl)amino)-4-phenylbutan-2-ol,
(2S,3S)-3-((9H-fluoren-9-yl)amino)-1-((3-methoxybenzyl)amino)-4-phenylbutan-2-ol,
(2S,3S)-3-((9H-fluoren-9-yl)amino)-1-((2-methoxybenzyl)amino)-4-phenylbutan-2-ol,
(2R,3S)-3-((9H-fluoren-9-yl)amino)-4-phenyl-1-((3-(trifluoromethyl)benzyl)amino)-butan ol,
(2R,3S)-3-((9H-fluoren-9-yl)amino)-4-phenyl-1-(((S)-1-phenylethyl)amino)butan-2-ol,
(2R,3S)-3-((9H-fluoren-9-yl)amino)-4-phenyl-1-((2-phenylpropan-2-yl)amino)butan-2-ol,
(2S,3S)-3-((9H-fluoren-9-yl)amino)-1-((cyclohexylmethyl)amino)-4-phenylbutan-2-ol,
(2S,3S)-3-((9H-fluoren-9-yl)amino)-1-(tert-butylamino)-4-phenylbutan-2-ol,
(2R,3S)-3-((9H-fluoren-9-yl)amino)-1-(neopentylamino)-4-phenylbutan-2-ol,
(2R,3S)-3-((9H-fluoren-9-yl)amino)-4-phenyl-1-((2,2,2-trifluoroethyl)amino)butan-2-ol,
(2S,3S)-3-((9H-fluoren-9-yl)amino)-1-((cyclopropylmethyl)amino)-4-phenylbutan-2-ol,
(2R,3S)-3-((9H-fluoren-9-yl)amino)-1-((cyclopropylmethyl)amino)-4-phenylbutan-2-ol,
N-((2S,3S)-4-(benzylamino)-3-hydroxy-1-phenylbutan-2-yl)-2-(9H-fluoren-9-yl)acetamide, N-((2S,3S)-4-((4-(tert-butyl)benzyl)amino)-3-hydroxy-1-phenylbutan-2-yl)-9H-fluorene-9-carboxamide,
N-((2S,3S)-4-((4-(tert-butyl)benzyl)amino)-3-hydroxy-1-phenylbutan-2-yl)-2-(9H-fluoren-9-yl)acetamide,
2-(9H-fluoren-9-yl)-N-((2S,3S)-3-hydroxy-4-((2-methoxybenzyl)amino)-1-phenylbutan-2-yl)acetamide,
2-(9H-fluoren-9-yl)-N-((2S,3R)-3-hydroxy-1-phenyl-4-((3-(trifluoromethyl)benzyl)-amino)butan-2-yl)acetamide,
N-((2S,3R)-3-hydroxy-1-phenyl-4-(((S)-1-phenylethyl)amino)butan-2-yl)-9H-fluorene-9-carboxamide,
2-(9H-fluoren-9-yl)-N-((2S,3R)-3-hydroxy-1-phenyl-4-(((S)-1-phenylethyl)amino)butan-2-yl)acetamide,
N-((2S,3R)-3-hydroxy-1-phenyl-4-((2-phenylpropan-2-yl)amino)butan-2-yl)-9H-fluorene-9-carboxamide,
2-(9H-fluoren-9-yl)-N-((2S,3R)-3-hydroxy-1-phenyl-4-((2-phenylpropan-2-yl)amino)-butan-2-yl)acetamide,
N-((2S,3R)-3-hydroxy-4-(neopentylamino)-1-phenylbutan-2-yl)-9H-fluorene-9-carboxamide,
2-(9H-fluoren-9-yl)-N-((2S,3R)-3-hydroxy-4-(neopentylamino)-1-phenylbutan yl)acetamide and
N-((2S,3R)-4-((cyclopropylmethyl)amino)-3-hydroxy-1-phenylbutan-2-yl)-2-(9H-fluoren yl)acetamide.

Compounds that are preferred embodiments of the invention are shown in Table 1 below.

TABLE 1

Exemplary compounds according to the invention.

| Name | Structure | SMILES |
|---|---|---|
| (1) | | O[C@H](CNCC1=CC=CC=C1)[C@H](CC2=CC=CC=C2)NC3C4=C(C=CC=C4)C5=C3C=CC=C5 |
| (2) | | O[C@@H](CNCC1=CC=CC=C1)[C@H](CC2=CC=CC=C2)NC3C4=C(C=CC=C4)C5=C3C=CC=C5 |
| (3) | | O[C@H](CNCC1=CC(C(C)(C)C)=CC=C1)[C@H](CC2=CC=CC=C2)NC3C4=C(C=CC=C4)C5=C3C=CC=C5 |
| (4) | | O[C@H](CNCC1=CC(C(C)C)=CC=C1)[C@H](CC2=CC=CC=C2)NC3C4=C(C=CC=C4)C5=C3C=CC=C5 |
| (5) | | O[C@@H](CNCC1=CC=C(C(C)(C)C)C=C1)[C@H](CC2=CC=CC=C2)NC3C4=C(C=CC=C4)C5=C3C=CC=C5 |

TABLE 1-continued

Exemplary compounds according to the invention.

| Name | Structure | SMILES |
|---|---|---|
| (6) | | O[C@@H](CNCC1=CC(OC)=CC=C1)[C@H](CC2=CC=CC=C2)NC3C4=C(C=CC=C4)C5=C3C=CC=C5 |
| (7) | | O[C@@H](CNCC1=C(OC)C=CC=C1)[C@H](CC2=CC=CC=C2)NC3C4=C(C=CC=C4)C5=C3C=CC=C5 |
| (8) | | O[C@H](CNCC1=CC(C(F)(F)F)=CC=C1)[C@H](CC2=CC=CC=C2)NC3C4=C(C=CC=C4)C5=C3C=CC=C5 |
| (9) | | O[C@H](CN[C@@H](C)C1=CC=CC=C1)[C@H](CC2=CC=CC=C2)NC3C4=C(C=CC=C4)C5=C3C=CC=C5 |
| (10) | | O[C@H](CNC(C)(C)C1=CC=CC=C1)[C@H](CC2=CC=CC=C2)NC3C4=C(C=CC=C4)C5=C3C=CC=C5 |
| (11) | | O[C@@H](CNCC1CCCCC1)[C@H](CC2=CC=CC=C2)NC3C4=C(C=CC=C4)C5=C3C=CC=C5 |

TABLE 1-continued

Exemplary compounds according to the invention.

| Name | Structure | SMILES |
|---|---|---|
| (12) | | O[C@@H](CNC(O(C)O[C@H](CC1=CC=CC=C1)NC2C3=C(C=CC=C3)C4=C2C=CC=C4 |
| (13) | | O[C@H](CNCC(C)(C)C)[C@H](CC1=CC=CC=C1)NC2C3=C(C=CC=C3)C4=C2C=CC=C4 |
| (14) | | O[C@H](CNCC(F)(F)F)[C@H](CC1=CC=CC=C1)NC2C3=C(C=CC=C3)C4=C2C=CC=C4 |
| (15) | | O[C@@H](CNCC1CC1)[C@H](CC2=CC=CC=C2)NC3C4=C(C=CC=C4)C5=C3C=CC=C5 |
| JT-3 (16) | | O[C@H](CNCC1CC1)[C@H](CC2=CC=CC=C2)NC3C4=C(C=CC=C4)C5=C3C=CC=C5 |
| (17) | | O=C(N[C@H]([C@@H](O)CNCC1=CC=CC=C1)CC2=CC=CC=C2)CC3C4=C(C=CC=C4)C5=C3C=CC=C5 |

TABLE 1-continued

Exemplary compounds according to the invention.

| Name | Structure | SMILES |
|---|---|---|
| (18) | | O=C(N[C@H]([C@@H](O)CNCC1=CC=C(C(C)(C)C)C=C1)CC2=CC=CC=C2)C3C(C=CC=C4)=C4C5=C3C=CC=C5 |
| (19) | | O=C(N[C@H]([C@@H](O)CNCC1=CC=C(C(C)(C)C)C=C1)CC2=CC=CC=C2)CC3C4=C(C=CC=C4)C5=C3C=CC=C5 |
| (20) | | O=C(N[C@H]([C@@H](O)CNCC1=C(OC)C=CC=C1)CC2=CC=CC=C2)CC3C4=C(C=CC=C4)C5=C3C=CC=C5 |
| (21) | | O=C(N[C@H]([C@H](O)CNCC1=CC(C(F)(F)F)=CC=C1)CC2=CC=CC=C2)CC3C4=C(C=CC=C4)C5=C3C=CC=C5 |
| (22) | | O=C(N[C@H]([C@H](O)CN[C@@H](C)C1=CC=CC=C1)CC2=CC=CC=C2)C3C(C=CC=C4)=C4C5=C3C=CC=C5 |
| (23) | | O=C(N[C@H]([C@H](O)CN[C@@H](C)C1=CC=CC=C1)CC2=CC=CC=C2)CC3C4=C(C=CC=C4)C5=C3C=CC=C5 |

TABLE 1-continued

Exemplary compounds according to the invention.

| Name | Structure | SMILES |
|---|---|---|
| (24) | | O=C(N[C@H]([C@H](O)CNC(C)(CC1=CC=CC=C1)CC2=CC=CC=C2)C3C(C=CC=C4)=C4C5=C3C=CC=C5 |
| (25) | | O=C(N[C@H]([C@H](O)CNC(C)(CC1=CC=CC=C1)CC2=CC=CC=C2)CC3C4=C(C=CC=C4)C5=C3C=CC=C5 |
| (26) | | O=C(N[C@H]([C@H](O)CNCC(C)(C)C)CC1=CC=CC=C1)C2C(C=CC=C3)=C3C4=C2C=CC=C4 |
| (27) | | O=C(N[C@H]([C@H](O)CNCC(C)(C)C)CC1=CC=CC=C1)CC2C3=C(C=CC=C3)C4=C2C=CC=C4 |
| (28) | | O=C(N[C@H]([C@H](O)CNCC1CC1)CC2=CC=CC=C2)CC3C4=C(C=CC=C4)C5=C3C=CC=C5 |

Another object of the invention is a compound as defined above for use in the treatment or prevention of Alzheimer's disease, in particular as a multifunctional inhibitor of the BuChE and BACE1 enzymes and beta-amyloid aggregation.

The invention also relates to the use of new 9H-fluorene derivatives defined by formula 1 for the preparation of active substances for the treatment of Alzheimer's disease, in particular as multifunctional inhibitors of BuChE and BACE1 enzymes and beta-amyloid aggregation.

The object of the invention is therefore new compounds of the character of multifunctional ligands with a potential effect on Alzheimer's disease, both by modifying the course of the disease and alleviating its symptoms.

The new compounds were designed according to the concept of multifunctional ligands. This term is used to describe molecules that act on more than one biological target, thus causing a comprehensive action in a given disease entity. Achieving this effect is possible thanks to the combination of structural fragments responsible for binding with various biological targets in one molecule. The use of a multifunctional ligand allows to reduce the amount of medications taken, and therefore simplify the therapy. It also lowers the risk of potential interactions with other medications being received.

A new group of compounds, which is the object of the invention, has been synthesized and in vitro experimental studies have confirmed its multidirectional biological activity-inhibition of the butyrylcholinesterase and β-secretase enzymes and inhibition of β-amyloid aggregation. By inhibiting the β-secretase enzyme and β-amyloid aggregation, new molecules may become a new therapy in Alzheimer's disease, interfering with the causes of its formation. Inhibition of the butyrylcholinesterase enzyme may beneficially alleviate the symptoms of the disease.

The multifunctional compounds being the subject of the invention are characterized by favorable drug-like properties and unique biological properties.

In vivo animal studies demonstrated the efficacy of the tested multifunctional ligand in models for the improvement of impaired memory functions.

FIG. 2 presents the effect of the tested compound JT-3 on memory processes in mice in the passive avoidance test.

FIG. 3 shows the effect of JT-3 on learning in the acquisition phase of the Morris Water Maze Test.

FIG. 4 shows the effect of compound JT-3 on the recall of memory traces on day 7 in the Morris water maze test.

FIG. 5 shows the effect of compound JT-3 on learning in the Barnes maze test in acquisition phase.

FIG. 8 shows the effect of JT-3 on spontaneous motor activity in mice.

DETAILED DESCRIPTION OF THE INVENTION

For a better understanding of its essence, the invention is additionally explained by the following examples.

General Procedure for the Synthesis of Compounds:

The preparation of compounds 1-28 according to formula 1 of the invention is carried out in four steps as shown in scheme 1:

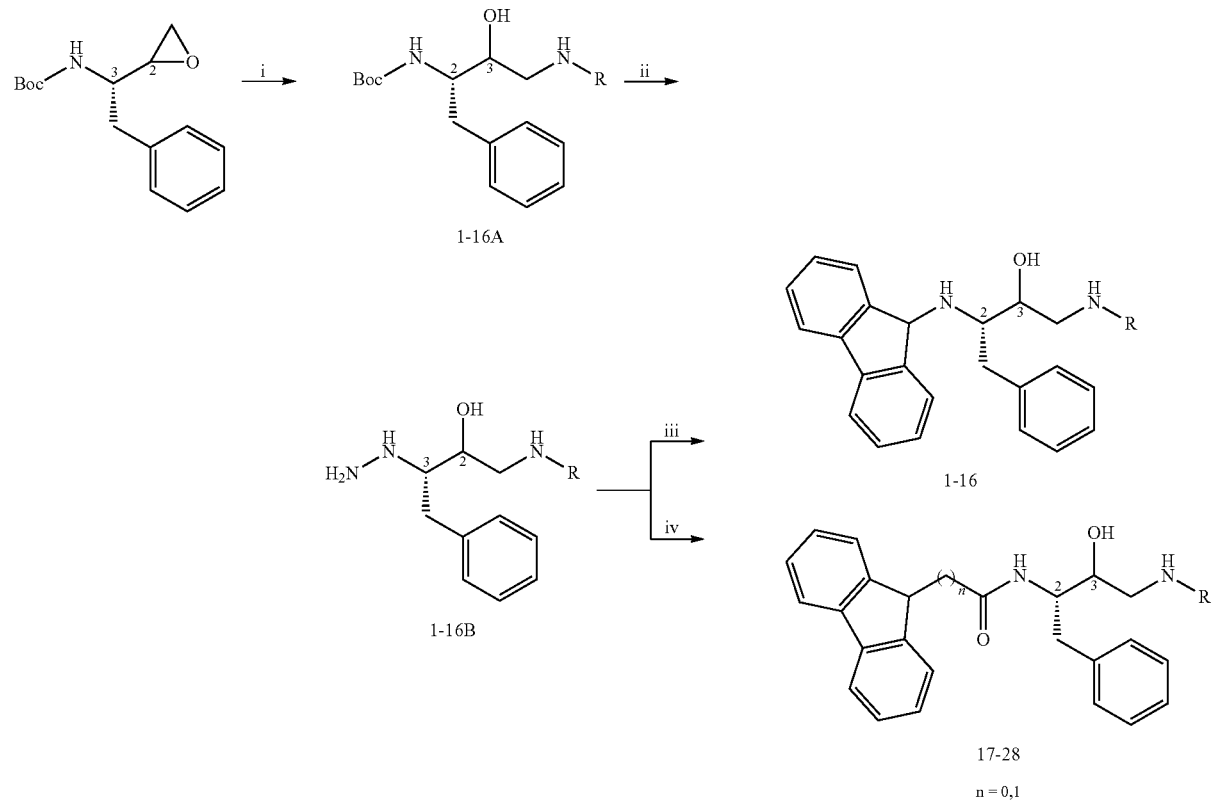

The multifunctional compounds being the subject of the invention have been synthesized, their chemical structure has been confirmed and their activity has been confirmed in biological tests.

The results of biological tests indicate their therapeutic potential in the treatment of neurodegenerative diseases, in particular Alzheimer's disease.

Figure 1:
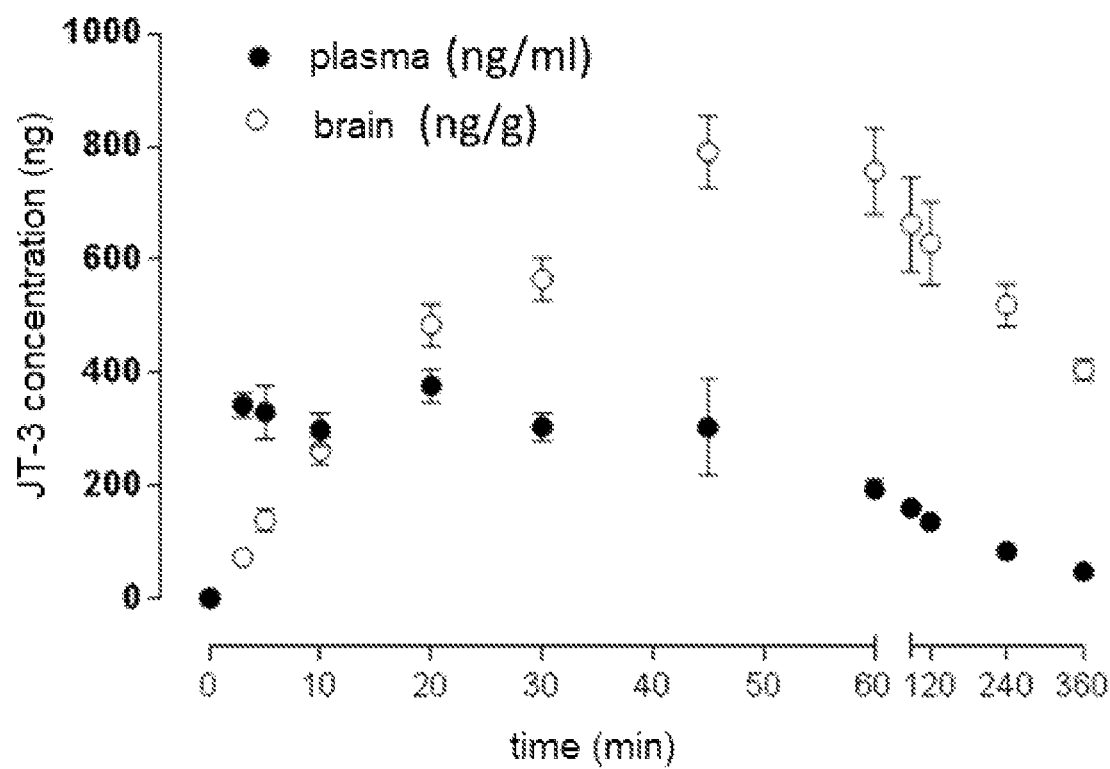
FIG. 1 shows the changes in JT-3 concentrations in plasma and brain.

Scheme 1. Reaction conditions: (i) appropriate amine, pyridine (cat.), n-propanol/isopropanol, reflux, 16 h; (ii) TFA, DCM, room temp, 2 h; (iii) 9-bromo-9H-fluorene, $K_2CO_3$, acetonitrile, room temperature, 16 h; (iv) 9H-fluorene-9-carboxylic acid/9H-fluorene-9-acetic acid, EDC, HOBt, DMAP, DCM, room temperature, 24 h.

Step 1

(2S,3S)-3-[(tert-butoxycarbonyl)amino]-1,2-epoxy-4-phenylbutane or (2R,3S)-3-[(tert-butoxycarbonyl)amino]-1,2-epoxy-4-phenylbutane (1 eq.) and the appropriate amine (1-2 eq.) were dissolved in n-propanol or isopropanol. A catalytic amount of pyridine was added and the mixture was stirred at the reflux temperature for 16 hours. Then, the solvent was distilled off, and the obtained residue was purified by flash column chromatography using a mixture of dichloromethane (DCM) and methanol (isocratic or gradient separation).

Step 2

The next step was the deprotection of the amino group. The corresponding derivative obtained in the first step was dissolved in dichloromethane. Then, trifluoroacetic acid (TFA) (5 mL/1 mmol of substrate) was added dropwise to the solution. The reaction mixture was left for two hours at room temperature. After completion of the reaction, the solvent and acid were distilled off under reduced pressure, and the resulting residue was dissolved in an aqueous ammonia solution and extracted with DCM. The combined organic phases were dried with anhydrous sodium sulfate, filtered and concentrated.

Step 3

Final amine compounds were obtained by nucleophilic substitution reaction of 9-bromo-9H-fluorene (1 equivalent) with the primary amino group of the product obtained in Step 2 (1 equivalent). These reactions were carried out in the presence of potassium carbonate (2 equivalents) in acetonitrile for 16 h at room temperature. The final product was purified by extraction (water/ethyl acetate) and flash column chromatography using a dichloromethane and methanol solvent mixture (isocratic or gradient system).

Step 4

The final amide compounds were prepared by the reaction between the appropriate acid and the amine obtained in step 2 in the presence of coupling agents and a base. Dimethylaminopyridine (DMAP, 0.5 equivalent), hydroxybenzotriazole (HOBt, 1.3 equivalent) and 1-ethyl-3-(3-dimethylaminopropyl)carbodiimide (EDC, 1.3 equivalent) were sequentially added to a solution of 9H-fluorene-9-carboxylic acid or 9H-fluorene-9-acetic acid (1 equivalent) in anhydrous dichloromethane (10 mL/1 mmol of substrate). The reaction mixture was left for half an hour at room temperature and then appropriate 1-substituted 1,3-diamino-4-phenylbutan-2-ol (1 equivalent) was added. The whole mixture was left for 24 h at room temperature. The final product was purified by extraction (water/dichloromethane) and flash column chromatography using dichloromethane and methanol (isocratic or gradient system).

Analytical Methods

Proton Magnetic Resonance ($^1$H NMR) spectra were recorded at 300 or 500 MHz, Carbon Magnetic Resonance ($^{13}$C NMR) spectra were recorded at 75 or 126 MHz using a Mercury-300 "Varian" or Jeol 500 spectrometer using tetramethylsilane (TMS) as an internal standard. Deuterated chloroform CDCl$_3$ was used as a solvent for the compounds samples. J values are given in hertz (Hz); s (singlet), br s (broad singlet), d (doublet), dd (doublet of doublets), br d (broad doublet), br dd (broad doublet of doublets), ddd (doublet of doublets of doublets), dt (doublet of triplets), dtt (doublet of triplets of triplets), dtd (doublet of triplets of doublets), t (triplet), br t (broad triplet), td (triplet of doublets), tt (triplet of triplets), q (quartet), qd (quartet of doublets), m (multiplet).

Liquid chromatography mass spectrometry (LC-MS) analysis was performed on a Waters Acquity TQD instrument equipped with an Acquity UPLC BEH C18 1.7 µm column (2.1×100 mm). Separation was carried out under the following conditions: flow 0.3 mL/min in a gradient of water (+0.1% HCOOH) and acetonitrile (+0.1% HCOOH) over 10 minutes. A UV DAD detector in the range of 200-700 nm was used. In the mass analysis, the electrospray ionization method was used with a capillary potential of 3 kV.

The compounds were purified by automated flash column chromatography or by high performance preparative liquid column chromatography (HPLC). "Flash" chromatography was performed on a Biotage Isolera One apparatus. Silica gel with a pore size of 50 µm was used as column packing. Preparative HPLC was performed on a Jasco LC-4000 apparatus. A Phenomenex Luna C8 5 µm column (15×21.2 mm) and a H$_2$O/CH$_3$CN gradient with 0.1% formic acid was used.

Thin layer chromatography (TLC) was performed on aluminum foil plates coated with silica gel 60 F 254 0.2 mm thick (Merck). In order to identify the spots, a UV lamp with a wavelength of λ=254 nm and a ninhydrin staining solution were used.

EXAMPLE 1. SYNTHESIS OF COMPOUNDS 1-28 ACCORDING TO FORMULA 1

Example 1.1 Synthesis of Compound 1

Synthesis of Intermediates tert-butyl ((2S,3R)-4-(benzylamino)-3-hydroxy-1-phenylbutan-2-yl)carbamate (1A)

Reaction of (2S,3S)-3-[(tert-butoxycarbonyl)amino]-1,2-epoxy-4-phenylbutane (2 g, 7.6046 mmol) with benzylamine (0.893 g, 8.3651 mmol) in the presence of a catalytic amount of pyridine in 40 mL of isopropanol was carried out as described in step 1. Purification: flash column chromatography (5% MeOH in DCM). Yield: 1.788 g (63.5%), TLC (DCM/MeOH, 9/1 v/v), R$_f$=0.38, MW 370.49, Formula: C$_{22}$H$_{30}$N$_2$O$_3$, MS m/z 371.24 (M+H$^+$), $^1$H NMR (500 MHz, CHLOROFORM-d) δ ppm 7.32-7.39 (m, 4H), 7.25-7.32 (m, 3H), 7.17-7.24 (m, 3H), 4.68 (d, J=9.17 Hz, 1H), 3.88-4.02 (m, 1H), 3.75-3.88 (m, 2H), 3.51-3.61 (m, 1H), 3.42 (br s, 2H), 3.01 (d, J=13.75 Hz, 1H), 2.73-2.91 (m, 3H), 1.20-1.39 (m, 9H).

(2R,3S)-3-Amino-1-(benzylamino)-4-phenylbutan-2-ol (1B)

Reaction of tert-butyl ((2S,3R)-4-(benzylamino)-3-hydroxy-1-phenylbutan-2-yl)carbamate (1A) (0.700 g, 2.589 mmol) with 2 mL of TFA in 1 mL of DCM was carried out as described in step 2. Purification: extraction (aqueous ammonia/DCM). Yield: 0.440 g (86.14%), TLC (DCM/MeOH/NH$_{3(aq)}$, 9/0.5/0.05 v/v/v) R$_f$=0.32, MW 270.38, Formula: C$_{17}$H$_{22}$N$_2$O, MS m/z 271.28 (M+H$^+$), $^1$H NMR (500 MHz, CHLOROFORM-d) δ ppm 7.11-7.40 (m, 10H), 3.77-3.90 (m, 2H), 3.63 (ddd, J=8.31, 4.87, 3.44 Hz, 1H), 3.10-3.16 (m, 1H), 2.81-2.97 (m, 3H), 2.72-2.81 (m, 1H), 2.47 (dd, J=13.46, 10.02 Hz, 1H), 2.24 (br s, 3H).

(2R,3S)-3-((9H-fluoren-9-yl)amino)-1-(benzylamino)-4-phenylbutan-2-ol (1)

Reaction between (2R,3S)-3-amino-1-(benzylamino)-4-phenylbutan-2-ol (1B) (200 mg, 0.7397 mmol) and 9-bromo-9H-fluorene (181.3 mg, 0.7397 mmol) in the presence of potassium carbonate (204.5 mg, 1.4794 mmol) in 6 mL of acetonitrile was carried out as described in step 3. Purification: extraction (water/ethyl acetate), flash column chromatography (5% MeOH in DCM). Yield: 107 mg (33.30%), TLC (DCM/MeOH, 9/1 v/v) R$_f$=0.38, MW 434.58, Formula: $C_{30}H_{30}N_2O$, MS m/z 435.49 (M+H$^+$), $^1$H NMR (500 MHz, CHLOROFORM-d) δ ppm 7.66-7.74 (m, 2H), 7.62 (d, J=7.45 Hz, 1H), 7.27-7.41 (m, 8H), 7.13-7.25 (m, 5H), 6.98-7.13 (m, 2H), 4.96 (s, 1H), 3.62-3.90 (m, 2H), 3.59 (dt, J=9.59, 4.65 Hz, 1H), 3.00 (dt, J=9.17, 4.58 Hz, 1H), 2.80-2.95 (m, 2H), 2.73 (dd, J=13.75, 4.58 Hz, 1H), 2.59 (br s, 3H), 2.43 (dd, J=13.46, 9.45 Hz, 1H); $^{13}$C NMR (126 MHz, CHLOROFORM-d) δ ppm 144.38, 144.00, 141.29, 140.98, 139.23, 138.85, 129.37, 129.16, 128.69, 128.59, 128.48, 128.41, 127.65, 127.57, 127.22, 126.40, 125.70, 125.33, 120.33, 120.00, 69.977, 66.08, 56.17, 55.51, 53.39, 38.92.

Example 1.2 Synthesis of Compound 2

Synthesis of Intermediates tert-butyl ((2S,3S)-4-(benzylamino)-3-hydroxy-1-phenylbutan-2-yl)carbamate (2A)

Reaction of (2R,3S)-3-[(tert-butoxycarbonyl)amino]-1,2-epoxy-4-phenylbutane (2 g, 7.6046 mmol) with benzylamine (0.893 g, 8.3651 mmol) in the presence of a catalytic amount of pyridine in 40 mL of isopropanol was carried out as described in step 1. Purification: flash column chromatography (2-8% MeOH in DCM). Yield: 1.33 g (46.97%), TLC (DCM/MeOH, 9/1 v/v) $R_f$=0.38, MW 370.49, Formula: $C_{22}H_{30}N_2O_3$, MS m/z 371.50 (M+H$^+$), $^1$H NMR (300 MHz, CHLOROFORM-d) δ ppm 7.17-7.38 (m, 10H), 4.97 (d, J=9.38 Hz, 1H), 3.66-3.81 (m, 3H), 3.54-3.62 (m, 1H), 2.82-3.00 (m, 2H), 2.56-2.73 (m, 2H), 2.31 (br s, 2H), 1.32-1.46 (m, 9H).

(2S,3S)-3-Amino-1-(benzylamino)-4-phenylbutan-2-ol (2B)

The reaction of tert-butyl ((2S,3S)-4-(benzylamino)-3-hydroxy-1-phenylbutan-2-yl)carbamate (2A) (0.330 g, 1.222 mmol) with 1 mL of TFA in 0.5 mL of DCM was carried out as described in step 2. Purification: extraction (aqueous ammonia/DCM). Yield: 0.220 g (91.36%), TLC (DCM/MeOH, 9/1 v/v) $R_f$=0.28, MW 270.38, Formula: $C_{17}H_{22}N_2O$, MS m/z 271.42 (M+H$^+$), $^1$H NMR (300 MHz, CHLOROFORM-d) δ ppm 7.15-7.36 (m, 10H), 3.73-3.86 (m, 2H), 3.53 (dt, J=7.77, 4.03 Hz, 1H), 2.81-2.99 (m, 2H), 2.78 (d, J=4.10 Hz, 1H), 2.66-2.74 (m, 1H), 2.53 (dd, J=13.19, 9.08 Hz, 1H), 1.95 (br s, 4H).

(2S,3S)-3-((9H-fluoren-9-yl)amino)-1-(benzylamino)-4-phenylbutan-2-ol (2)

Reaction between (2S,3S)-3-amino-1-(benzylamino)-4-phenylbutan-2-ol (2B) (100 mg, 0.3698 mmol) and 9-bromo-9H-fluorene (90.6 mg, 0.3698 mmol) in the presence of potassium carbonate (102 mg, 0.7396 mmol) in 3 mL of acetonitrile was carried out as described in step 3. Purification: extraction (water/ethyl acetate), flash column chromatography (5% MeOH in DCM). Yield: 28.6 mg (17.80%), TLC (DCM/MeOH, 9/1 v/v) $R_f$=0.38, MW 434.58, Formula: $C_{30}H_{30}N_2O$, MS m/z 435.31 (M+H$^+$), $^1$H NMR (300 MHz, CHLOROFORM-d) δ ppm 7.62-7.74 (m, 4H), 7.10-7.43 (m, 14H), 4.95 (s, 1H), 3.70 (s, 2H), 3.50 (ddd, J=8.21, 5.27, 3.52 Hz, 1H), 2.93 (ddd, J=8.79, 5.27, 3.52 Hz, 1H), 2.71 (dd, J=13.48, 5.27 Hz, 1H), 2.56-2.67 (m, 2H), 2.50 (dd, J=13.48, 8.79 Hz, 1H), 1.47 (br s, 3H); $^{13}$C NMR (75 MHz, CHLOROFORM-d) δ ppm 144.33, 144.27, 141.11, 140.92, 139.42, 139.11, 129.22, 129.06, 128.52, 128.48, 128.29, 128.26, 127.39, 127.36, 127.10, 126.25, 125.47, 125.32, 120.10, 119.96, 69.38, 66.20, 56.41, 54.35, 53.94, 40.94.

Example 1.3 Synthesis of Compound 3

Synthesis of Intermediates tert-butyl ((2S,3R)-4-((3-(tert-butyl)benzyl)amino)-3-hydroxy-1-phenylbutan yl)carbamate (3A)

Reaction of (2S,3S)-3-[(tert-butoxycarbonyl)amino]-1,2-epoxy-4-phenylbutane (0.731 g, 2.7795 mmol) with 3-tert-butylbenzylamine (0.500 g, 3.0575 mmol) in the presence of catalytic the amounts of pyridine in 20 mL of isopropanol was carried out as described in step 1. Purification: flash column chromatography (5% MeOH in DCM). Yield: 0.500 g (42.23%), TLC (DCM/MeOH, 9/1 v/v) $R_f$=0.38, MW 426.60, Formula: $C_{26}H_{38}N_2O_3$, $^1$H NMR (500 MHz, CHLOROFORM-d) δ ppm 7.26-7.38 (m, 5H), 7.15-7.24 (m, 4H), 4.68-4.74 (m, 1H), 3.74-3.90 (m, 3H), 3.50-3.59 (m, 1H), 2.54-3.38 (m, 6H), 1.29-1.40 (m, 18H).

(2R,3S)-3-amino-1-((3-(tert-butyl)benzyl)amino)-4-phenylbutan-2-ol (3B)

Reaction of tert-butyl ((2S,3R)-4-((3-(tert-butyl)benzyl)amino)-3-hydroxy-1-phenylbutan-2-yl)carbamate (3A) (0.500 g, 1.172 mmol) with 1.5 mL of TFA in 1 mL of DCM was carried out as described in step 2. Purification: extraction (aqueous ammonia/DCM). Yield: 0.350 g (91.62%), TLC (DCM/MeOH, 9/1 v/v) $R_f$=0.33, MW 326.48, Formula: $C_{21}H_{30}N_2O$, $^1$H NMR (500 MHz, CHLOROFORM-d) δ ppm 7.08-7.38 (m, 9H), 3.77-3.92 (m, 2H), 3.61-3.68 (m, 1H), 3.12-3.20 (m, 1H), 2.93 (m, 2H), 2.82 (m, 1H), 2.43-2.50 (m, 1H), 2.25 (br s, 4H), 1.34 (s, 9H).

(2R,3S)-3-((9H-fluoren-9-yl)amino)-1-((3-(tert-butyl)benzyl)amino)-4-phenylbutan-2-ol (3)

Reaction between (2R,3S)-3-amino-1-((3-(tert-butyl)benzyl)amino)-4-phenylbutan-2-ol (3B) (100 mg, 0.3063 mmol) and 9-bromo-9H-fluorene (75.1 mg, 0.3063 mmol) in the presence of potassium carbonate (84.6 mg, 0.6126 mmol) in 4 mL of acetonitrile was carried out as described in step 3. Purification: extraction (water/ethyl acetate), flash column chromatography (5% MeOH in DCM). Yield: 44 mg (29.27%), TLC (DCM/MeOH, 9/1 v/v) $R_f$=0.4, MW 490.69, Formula: $C_{34}H_{38}N_2O$, MS m/z 491.40 (M+H$^+$), $^1$H NMR (500 MHz, CHLOROFORM-d) δ ppm 7.68-7.78 (m, 3H), 7.63 (d, J=7.45 Hz, 1H), 7.23-7.44 (m, 9H), 7.16-7.21 (m, 2H), 7.11-7.15 (m, 2H), 4.98 (s, 1H), 3.75 (br s, 2H), 3.55 (m, J=9.16 Hz, 1H), 2.92-3.02 (m, 2H), 2.76-2.83 (m, 1H), 2.50 (br s, 1H), 2.40 (dd, J=13.46, 9.45 Hz, 1H), 1.33 (s, 9H), 1.31 (br s, 3H); $^{13}$C NMR (126 MHz, CHLOROFORM-d) δ ppm 151.55, 144.54, 144.09, 141.31, 140.98, 139.12, 138.89, 129.38, 128.56, 128.46, 128.39, 127.64, 127.18, 126.34, 126.18, 126.02, 125.71, 125.29, 124.47, 120.35, 120.00, 70.22, 66.10, 56.51, 55.54, 53.54, 39.46, 34.76, 31.50.

Example 1.4 Synthesis of Compound 4

Synthesis of Intermediates tert-butyl ((2S,3R)-3-hydroxy-4-((3-isopropylbenzyl)amino)-1-phenylbutan-2-yl)carbamate (4A)

Reaction of (2S,3S)-3-[(tert-butoxycarbonyl)amino]-1,2-epoxy-4-phenylbutane (0.379 g, 1.4411 mmol) with 3-isopropylbenzylamine (0.2366 g, 1.5852 mmol) in the presence of a catalytic amount of pyridine in 10 mL of isopropanol was carried out as described in step 1. Purification: flash column chromatography (5% MeOH in DCM). Yield: 0.366 g (61.56%), TLC (DCM/MeOH, 9/1 v/v) $R_f$=0.38, MW 412.57, Formula: $C_{25}H_{36}N_2O_3$, $^1$H NMR (300 MHz, CHLOROFORM-d) δ ppm 7.10-7.37 (m, 9H), 5.58 (br s, 1H), 4.78 (d, J=8.79 Hz, 1H), 4.31-4.38 (m, 1H), 3.91-4.03 (m, 1H), 3.68-3.86 (m, 3H), 3.53-3.62 (m, 1H), 3.41-3.51 (m, 3H), 2.53-3.02 (m, 7H), 1.15-1.41 (m, 9H).

(2R,3S)-3-amino-1-((3-isopropylbenzyl)amino)-4-phenylbutan-2-ol (4B)

Reaction of tert-butyl ((2S,3R)-3-hydroxy-4-((3-isopropylbenzyl)amino)-1-phenylbutan-2-yl)carbamate (4A) (0.366 g, 0.8871 mmol) with 1.5 mL of TFA in 1 mL of DCM was carried out as described in step 2. Purification: extraction (aqueous ammonia/DCM). Yield: 0.1955 g (70.53%), TLC (DCM/MeOH, 9/1 v/v) $R_f$=0.35, MW 312.46, Formula: $C_{20}H_{28}N_2O$, $^1$H NMR (500 MHz, CHLOROFORM-d) δ ppm 7.13-7.33 (m, 9H), 3.83-3.87 (m, 1H), 3.75-3.81 (m, 1H), 3.62-3.68 (m, 1H), 3.14 (dt, J=10.17, 4.37 Hz, 1H), 2.86-2.96 (m, 3H), 2.79 (dd, J=12.03, 8.02 Hz, 1H), 2.48 (dd, J=13.75, 9.74 Hz, 1H), 2.44 (br s, 4H), 1.27 (d, J=7.45 Hz, 6H).

(2R,3S)-3-((9H-fluoren-9-yl)amino)-1-((3-isopropylbenzyl)amino)-4-phenylbutan-2-ol (4)

Reaction between (2R,3S)-3-amino-1-((3-isopropylbenzyl)amino)-4-phenylbutan-2-ol (4B) (50 mg, 0.1600 mmol) and 9-bromo-9H-fluorene (39.2 mg, 0.1600 mmol) in the presence of potassium carbonate (44 mg, 0.3200 mmol) in 3 mL of acetonitrile was carried out as described in step 3. Purification: extraction (water/ethyl acetate), flash column chromatography (5% MeOH in DCM). Yield: 27.8 mg (36.44%), TLC (DCM/MeOH, 9/1 v/v) $R_f$=0.43, MW 476.66, Formula: $C_{33}H_{36}N_2O$, MS m/z 477.45 (M+H$^+$), $^1$H NMR (500 MHz, CHLOROFORM-d) δ ppm 7.67-7.77 (m, 3H), 7.62 (d, J=7.45 Hz, 1H), 7.37-7.44 (m, 2H), 7.34 (dt, J=14.32, 7.16 Hz, 2H), 7.15-7.29 (m, 6H), 7.09-7.15 (m, 3H), 4.98 (s, 1H), 3.71-3.80 (m, 2H), 3.52-3.58 (m, 1H), 2.85-3.00 (m, 3H), 2.78 (dd, J=13.75, 4.01 Hz, 1H), 2.34-2.53 (m, 2H), 1.53 (br s., 3H), 1.25 (d, J=6.87 Hz, 6H); $^{13}$C NMR (126 MHz, CHLOROFORM-d) δ ppm 149.31, 144.50, 144.05, 141.29, 140.97, 139.14, 139.04, 129.37, 128.65, 128.56, 128.45, 128.37, 127.64, 127.17, 126.58, 126.35, 125.71, 125.68, 125.27, 120.34, 119.97, 70.09, 65.97, 56.39, 55.53, 53.31, 39.30, 34.13, 24.22, 24.07.

Example 1.5 Synthesis of Compound 5

Synthesis of Intermediates tert-butyl ((2S,3S)-4-((4-(tert-butyl)benzyl)amino)-3-hydroxy-1-phenylbutan-2-yl)carbamate (5A)

Reaction of (2R,3S)-3-[(tert-butoxycarbonyl)amino]-1,2-epoxy-4-phenylbutane (2 g, 7.6046 mmol) with 4-tert-butylbenzylamine (1.364 g, 8.3651 mmol) in the presence of catalytic the amounts of pyridine in 40 mL of n-propanol was carried out as described in step 1. Purification: flash column chromatography (5% MeOH in DCM). Yield: 2.2289 g (68.97%), TLC (DCM/MeOH, 9/1 v/v) $R_f$=0.35, MW 426.60, Formula: $C_{26}H_{38}N_2O_3$, MS m/z 427.53 (M+H$^+$), $^1$H NMR (300 MHz, CHLOROFORM-d) δ ppm 7.15-7.39 (m, 9H), 4.93-5.04 (m, 1H), 3.64-3.79 (m, 3H), 3.53-3.66 (m, 1H), 2.82-3.00 (m, 2H), 2.09-2.75 (m, 4H), 1.40 (s, 9H), 1.32 (s, 9H).

(2S,3S)-3-amino-1-((4-(tert-butyl)benzyl)amino)-4-phenylbutan-2-ol (5B)

Reaction of tert-butyl ((2S,3S)-4-((4-(tert-butyl)benzyl)amino)-3-hydroxy-1-phenylbutan-2-yl)carbamate (5A) (1.2 g, 2.817 mmol) with 3 mL of TFA in 1.5 mL of DCM was carried out as described in step 2. Purification: extraction (aqueous ammonia/DCM). Yield: 0.862 g (93.87%), TLC (DCM/MeOH, 9/1 v/v) $R_f$=0.28, MW 326.48, Formula: $C_{21}H_{30}N_2O$, MS m/z 327.37 (M+H$^+$), $^1$H NMR (300 MHz, CHLOROFORM-d) δ ppm 7.13-7.39 (m, 9H), 4.06 (br s, 4H), 3.90-3.97 (m, 1H), 3.75-3.82 (m, 1H), 3.63-3.75 (m, 1H), 2.99-3.07 (m, 1H), 2.84-2.98 (m, 2H), 2.74-2.82 (m, 1H), 2.56-2.69 (m, 1H), 1.30 (s, 9H).

(2S,3S)-3-((9H-fluoren-9-yl)amino)-1-((4-(tert-butyl)benzyl)amino)-4-phenylbutan-2-ol (5)

Reaction between (2S,3S)-3-amino-1-((4-(tert-butyl)benzyl)amino)-4-phenylbutan-2-ol (5B) (150 mg, 0.4594 mmol) and 9-bromo-9H-fluorene (112.6 mg, 0.4594 mmol) in the presence of potassium carbonate (127 mg, 0.9188 mmol) in 4 mL of acetonitrile was carried out as described in step 3. Purification: extraction (water/ethyl acetate), flash column chromatography (5% MeOH in DCM). Yield: 42.1 mg (18.65%), TLC (DCM/MeOH, 9/1 v/v) $R_f$=0.48, MW 490.69, Formula: $C_{34}H_{38}N_2O$, MS m/z 491.47 (M+H$^+$), $^1$H NMR (300 MHz, CHLOROFORM-d) δ ppm 7.63-7.74 (m, 4H), 7.12-7.43 (m, 13H), 4.96 (s, 1H), 3.74 (br s, 2H), 3.48-3.58 (m, 1H), 2.88-2.99 (m, 1H), 2.67-2.80 (m, 1H), 2.43-2.66 (m, 4H), 1.70 (br s, 2H), 1.26-1.37 (m, 9H); $^{13}$C NMR (75 MHz, CHLOROFORM-d) δ ppm 150.30, 144.46, 144.41, 141.11, 140.92, 139.18, 136.25, 129.22, 128.77, 128.48, 128.23, 127.32, 127.06, 126.26, 125.52, 125.41, 125.35, 120.08, 119.93, 69.40, 65.97, 56.11, 54.12, 53.86, 40.88, 34.50, 31.37.

Example 1.6 Synthesis of Compound 6

Synthesis of Intermediates tert-butyl ((2S,3S)-3-hydroxy-4-((3-methoxybenzyl)amino)-1-phenylbutan-2-yl)carbamate (6A)

Reaction of (2R,3S)-3-[(tert-butoxycarbonyl)amino]-1,2-epoxy-4-phenylbutane (2.000 g, 7.594 mmol) with 3-methoxybenzylamine (1.042 g, 7.594 mmol) in the presence of catalytic amounts of pyridine in 20 mL of isopropanol was carried out as described in step 1. Purification: flash column chromatography (1-7% MeOH in DCM). Yield: 1.218 g (40.0%), TLC (DCM/MeOH, 9.5/0.5 v/v) $R_f$=0.45, MW 400.52, Formula: $C_{23}H_{32}N_2O_4$, $^1$H NMR (500 MHz, CHLOROFORM-d) δ ppm 7.17-7.37 (m, 6H), 6.86-6.92 (m, 2H), 6.81 (dd, J=8.02, 2.29 Hz, 1H), 4.68 (br s, 1H), 3.73-3.84 (m, 5H), 3.48-3.55 (m, 1H), 2.97 (dd, J=14.03, 4.87 Hz, 1H), 2.66-2.90 (m, 3H), 2.07 (br s, 3H), 1.35 (s, 9H).

(2S,3S)-3-amino-1-((3-methoxybenzyl)amino)-4-phenylbutan-2-ol (6B)

Reaction of tert-butyl ((2S,3S)-3-hydroxy-4-((3-methoxybenzyl)amino)-1-phenylbutan-2-yl)-carbamate (6A) (1.218 g, 3.041 mmol) with 6 mL of TFA in 4 mL of DCM was carried out as described in step 2. Purification: extraction (aqueous ammonia/DCM). Yield: 0.780 g (85.40%), TLC (DCM/MeOH, 9/1 v/v) $R_f$=0.34, MW 300.40, Formula: $C_{18}H_{24}N_2O$, $^1$H NMR (500 MHz, CHLOROFORM-d) δ ppm 7.15-7.34 (m, 6H), 6.89-6.94 (m, 2H), 6.81-6.84 (m, 1H), 3.83-3.87 (m, 1H), 3.82 (s, 3H), 3.76-3.81 (m, 1H), 3.62 (ddd, J=8.31, 4.87, 3.44 Hz, 1H), 3.12-3.17 (m, 1H), 2.84-2.93 (m, 2H), 2.78 (dd, J=12.03, 8.59 Hz, 1H), 2.46 (dd, J=13.46, 10.02 Hz, 1H), 2.09 (br s, 4H).

(2S,3S)-3-((9H-fluoren-9-yl)amino)-1-((3-methoxybenzyl)amino)-4-phenylbutan-2-ol (6)

Reaction between (2S,3S)-3-amino-1-((3-methoxybenzyl)amino)-4-phenylbutan-2-ol (6B) (120 mg, 0.3998 mmol) and 9-bromo-9H-fluorene (98 mg, 0.3998 mmol) in the presence of potassium carbonate (110 mg, 0.7996 mmol) in 3 mL of acetonitrile was carried out as described in step 3. Purification: extraction (water/ethyl acetate), flash column chromatography (5% MeOH in DCM). Yield: 27.1 mg (14.60%), TLC (DCM/MeOH, 9/1 v/v) $R_f$=0.33, MW 464.61, Formula: $C_{31}H_{32}N_2O_2$, MS m/z 465.35 (M+H$^+$), $^1$H NMR (300 MHz, CHLOROFORM-d) δ ppm 7.61-7.73 (m, 4H), 7.11-7.43 (m, 10H), 6.90-7.00 (m, 2H), 6.79 (dd, J=8.21, 2.34 Hz, 1H), 4.96 (s, 1H), 3.80 (s, 3H), 3.66 (s, 2H), 3.45-3.57 (m, 1H), 2.90-3.00 (m, 1H), 2.57-2.76 (m, 3H), 2.44-2.55 (m, 1H), 1.82 (br s, 3H); $^{13}$C NMR (75 MHz, CHLOROFORM-d) δ ppm 159.76, 144.33, 144.26, 141.11, 139.10, 129.51, 129.21, 128.48, 128.31, 127.35, 127.12, 126.28, 125.46, 121.27, 120.10, 114.60, 112.70, 69.51, 66.21, 56.44, 55.21, 54.54, 53.94, 40.91.

Example 1.7 Synthesis of Compound 7

Synthesis of Intermediates tert-butyl ((2S,3S)-3-hydroxy-4-((2-methoxybenzyl)amino)-1-phenylbutan-2-yl)carbamate (7A)

Reaction of (2R,3S)-3-[(tert-butoxycarbonyl)amino]-1,2-epoxy-4-phenylbutane (2 g, 7.6046 mmol) with 2-methoxybenzylamine (1.146 g, 8.3651 mmol) in the presence of a catalytic amount of pyridine in 40 mL of n-propanol was carried out as described in step 1. Purification: flash column chromatography (5% MeOH in DCM). Yield: 1.94 g (63.82%), TLC (DCM/MeOH, 9.5/0.5 v/v) $R_f$=0.16, MW 400.52, Formula: $C_{23}H_{32}N_2O_4$, MS m/z 401.38 (M+H$^+$), $^1$H NMR (500 MHz, CHLOROFORM-d) δ ppm 7.18-7.32 (m, 6H), 7.13 (d, J=7.45 Hz, 1H), 6.83-6.92 (m, 2H), 5.02 (d, J=9.74 Hz, 1H), 3.81 (s, 3H), 3.59-3.78 (m, 4H), 3.14 (br s, 2H), 2.84-2.97 (m, 2H), 2.52-2.64 (m, 2H), 1.36-1.44 (m, 9H).

(2S,3S)-3-amino-1-((2-methoxybenzyl)amino)-4-phenylbutan-2-ol (7B)

Reaction of tert-butyl ((2S,3S)-3-hydroxy-4-((2-methoxybenzyl)amino)-1-phenylbutan-2-yl)-carbamate (7A) (0.700 g, 2.333 mmol) with 3 mL of TFA in 1.5 mL DCM was carried out as described in step 2. Purification: extraction (aqueous ammonia/DCM). Yield: 0.500 g (95.24%), TLC (DCM/MeOH, 9.5/0.5 v/v) $R_f$=0.22, MW 300.40, Formula: $C_{18}H_{24}N_2O_2$, MS m/z 301.25 (M+H$^+$), $^1$H NMR (300 MHz, CHLOROFORM-d) δ ppm 7.15-7.34 (m, 7H), 6.85-6.96 (m, 2H), 3.85-3.92 (m, 1H), 3.83 (s, 3H), 3.75-3.82 (m, 1H), 3.59 (dt, J=7.47, 3.59 Hz, 1H), 2.83-2.94 (m, 3H), 2.44-2.75 (m, 6H).

(2S,3S)-3-((9H-fluoren-9-yl)amino)-1-((2-methoxybenzyl)amino)-4-phenylbutan-2-ol (7)

Reaction between (2S,3S)-3-amino-1-((2-methoxybenzyl)amino)-4-phenylbutan-2-ol (7B) (150 mg, 0.4993 mmol) and 9-bromo-9H-fluorene (122.4 mg, 0.4993 mmol) in the presence of potassium carbonate (138 mg, 0.9986 mmol) in 4 mL of acetonitrile was carried out as described in step 3. Purification: extraction (water/ethyl acetate), flash column chromatography (5% MeOH in DCM). Yield: 85.7 mg (36.95%), TLC (DCM/MeOH, 9/1 v/v) $R_f$=0.31, MW 464.61, Formula: $C_{31}H_{32}N_2O_2$, MS m/z 465.41 (M+H$^+$), $^1$H NMR (300 MHz, CHLOROFORM-d) δ ppm 7.64-7.74 (m, 3H), 7.57 (d, J=7.03 Hz, 1H), 7.08-7.42 (m, 11H), 6.88-6.98 (m, 2H), 4.91 (s, 1H), 4.00 (br s, 2H), 3.91 (s, 3H), 3.47-3.56 (m, 1H), 2.64-2.82 (m, 2H), 2.28-2.61 (m, 3H), 1.46 (br s, 3H); $^{13}$C NMR (75 MHz, CHLOROFORM-d) δ ppm 158.16, 144.73, 144.47, 141.04, 140.78, 139.24, 131.36, 129.24, 128.92, 128.39, 128.03, 127.23, 126.91, 126.13, 125.58, 125.46, 120.54, 120.04, 119.70, 110.64, 69.48, 65.65, 55.28, 54.49, 53.62, 51.86, 40.86.

Example 1.8 Synthesis of Compound 8

Synthesis of Intermediates tert-butyl ((2S,3R)-3-hydroxy-1-phenyl-4-((3-(trifluoromethyl)benzyl)amino)butan-2-yl)carbamate (8A)

Reaction of (2S,3S)-3-[(tert-butoxycarbonyl)amino]-1,2-epoxy-4-phenylbutane (2.0 g, 7.595 mmol) with 3-(trifluoromethyl)benzylamine (1.463 g, 8.355 mmol) in the presence of catalytic amount of pyridine in 45 mL of isopropanol was carried out as described in step 1. Purification: flash column chromatography (50% EtOAc in DCM). Yield: 1.97 g (59.16%), TLC (DCM/MeOH, 9/1 v/v) $R_f$=0.4, MW 438.49, Formula: $C_{23}H_{29}F_3N_2O_3$, MS m/z 439.03 (M+H$^+$), $^1$H NMR (500 MHz, CHLOROFORM-d) δ ppm 7.58 (s, 1H), 7.44-7.56 (m, 3H), 7.19-7.37 (m, 6H), 4.65 (br d, J=7.45 Hz, 1H), 3.80-3.91 (m, 3H), 3.49-3.55 (m, 1H), 2.79-3.01 (m, 2H), 2.75 (br s, 2H), 1.35 (s, 9H), NH signal was not registered.

(2R,3S)-3-amino-4-phenyl-1-((3-(trifluoromethyl)benzyl)amino)butan-2-ol (8B)

Reaction of tert-butyl ((2S,3R)-3-hydroxy-1-phenyl-4-((3-(trifluoromethyl)benzyl)amino)-butan-2-yl)carbamate (8A) (1.177 g, 2.67 mmol) with 6 mL of TFA in 2 mL of DCM was carried out as described in step 2. Purification: extraction (aqueous ammonia/DCM). Yield: 0.734 g (80.8%), TLC (DCM/MeOH, 9/1 v/v) $R_f$=0.1, MW 338.37, Formula: $C_{18}H_{21}F_3N_2O$, MS m/z 339.13 (M+H$^+$), $^1$H NMR (500 MHz, CHLOROFORM-d) δ ppm 7.60 (s, 1H), 7.55 (br d, J=8.02 Hz, 2H), 7.42-7.49 (m, 1H), 7.21-7.29 (m, 3H), 7.09-7.21 (m, 3H), 3.89-3.96 (m, 1H), 3.75-3.87 (m, 5H), 3.26 (br dd, J=9.16, 4.58 Hz, 1H), 2.86-2.94 (m, 1H), 2.77 (d, J=4.58 Hz, 1H), 2.75-2.83 (m, 1H), 2.48 (dd, J=13.75, 9.74 Hz, 1H).

(2R,3S)-3-((9H-fluoren-9-yl)amino)-4-phenyl-1-((3-(trifluoromethyl)benzyl)amino)-butan-2-ol (8)

Reaction between (2R,3S)-3-amino-4-phenyl-1-((3-(trifluoromethyl)benzyl)amino)butan-2-ol (8B) (300 mg, 0.8866 mmol) and 9-bromo-9H-fluorene (217 mg, 0.8866 mmol) in the presence of potassium carbonate (245 mg, 1.7732 mmol) in 10 mL of acetonitrile was carried out as described in step 3. Purification: extraction (water/ethyl acetate), flash column chromatography (5% MeOH in DCM), preparative HPLC (acetonitrile/water, gradient 20-90%). Yield: 32 mg TLC (DCM/MeOH, 9/1 v/v) $R_f$=0.4, MW 502.58, Formula: $C_{31}H_{29}F_3N_2O$, MS m/z 503.37 (M+H$^+$), $^1$H NMR (500 MHz, CHLOROFORM-d) δ ppm 7.57-7.61 (m, 3H), 7.53 (d, J=7.45 Hz, 1H), 7.36-7.46 (m, 3H), 7.30 (q, J=6.87 Hz, 3H), 7.05-7.22 (m, 5H), 6.98 (d, J=6.87 Hz, 2H), 4.84 (s, 1H), 3.66 (dt, J=8.45, 4.08 Hz, 1H), 3.48-3.60 (m, 5H), 3.00-3.09 (m, 1H), 2.83 (br d, J=10.88 Hz, 1H), 2.59 (br dd, J=13.75, 4.01 Hz, 2H), 2.38 (dd, J=13.17, 9.74 Hz, 1H); $^{13}$C NMR (126 MHz, CHLOROFORM-d) δ ppm 144.02, 143.65, 141.24, 141.02, 140.49, 138.97, 132.29, 130.84 (q, J=1.00 Hz), 129.36, 129.07, 128.66, 128.62, 128.59, 127.72, 127.31, 126.43, 125.70 (q, J=4.20 Hz) 125.63, 125.25, 124.35, (q, J=4.02 Hz), 120.40, 120.13, 70.58, 66.46, 55.61, 55.47, 54.31, 39.43.

Example 1.9 Synthesis of Compound 9

Synthesis of Intermediates tert-butyl ((2S,3R)-3-hydroxy-1-phenyl-4-(((S)-1-phenylethyl)amino)butan yl)carbamate (9A)

Reaction of (2S,3S)-3-[(tert-butoxycarbonyl)amino]-1,2-epoxy-4-phenylbutane (2.390 g, 9.077 mmol) with (S)-1-phenylethan-1-amine (1.000 g, 8.252 mmol) in the presence of a catalytic amount of pyridine in 20 mL of isopropanol was carried out as described in step 1. Purification: flash column chromatography (1-8% MeOH in DCM). Yield: 2.543 g (72.9%), TLC (DCM/MeOH, 9.5/0.5 v/v) $R_f$=0.32, MW 384.52, Formula: $C_{23}H_{32}N_2O_3$, MS m/z 385.59 (M+H$^+$), $^1$H NMR (300 MHz, CHLOROFORM-d) δ ppm 7.09-7.43 (m, 10H), 4.68 (d, J=8.79 Hz, 1H), 3.67-3.85 (m, 2H), 3.36-3.57 (m, 3H), 2.70-2.99 (m, 2H), 2.56 (d, J=4.69 Hz, 2H), 2.23 (br s, 2H), 1.17-1.47 (m, 10H).

(2R,3S)-3-amino-4-phenyl-1-(((S)-1-phenylethyl)amino)butan-2-ol (9B)

Reaction of tert-butyl ((2S,3R)-3-hydroxy-1-phenyl-4-(((S)-1-phenylethyl)amino)butan-2-yl)carbamate (9A) (0.375 g, 0.975 mmol) with 5 mL of TFA in 4 mL of DCM was carried out as described in step 2. Purification: extraction (aqueous ammonia/DCM). Yield: 0.275 g (99.0%), TLC (DCM/MeOH/NH$_{3(aq)}$, 9.5/0.5/0.05 v/v/v) $R_f$=0.21, MW 284.40, Formula: $C_{18}H_{24}N_2O$, $^1$H NMR (300 MHz, CHLOROFORM-d) δ ppm 7.04-7.40 (m, 10H), 3.70-3.83 (m, 1H), 3.46-3.60 (m, 2H), 3.02-3.12 (m, 1H), 2.69-2.91 (m, 3H), 2.54 (dd, J=11.72, 8.21 Hz, 1H), 2.41 (dd, J=13.48, 9.38 Hz, 1H), 1.56 (br s, 2H), 1.33-1.44 (m, 3H).

(2R,3S)-3-((9H-fluoren-9-yl)amino)-4-phenyl-1-4(S)-1-phenylethyl)amino)butan-2-ol (9)

The reaction between (2R,3S)-3-amino-4-phenyl-1-(((S)-1-phenylethyl)amino)butan-2-ol (9B) (150 mg, 0.5274 mmol) and 9-bromo-9H-fluorene (129 mg, 0.5274 mmol) in the presence of potassium carbonate (146 mg, 1.055 mmol) in 5 mL of acetonitrile was carried out as described in step 3. Purification: extraction (water/ethyl acetate), flash column chromatography (5% MeOH in DCM). Yield: 63 mg (26.63%), TLC (DCM/MeOH, 9/1 v/v) $R_f$=0.33, MW 448.61, Formula: $C_{31}H_{32}N_2O$, MS m/z 449.52 (M+H$^+$), $^1$H NMR (300 MHz, CHLOROFORM-d) δ ppm 7.65 (d, J=7.62 Hz, 2H), 7.13-7.40 (m, 14H), 6.94-7.03 (m, 2H), 4.80 (s, 1H), 4.18 (br s, 3H), 3.59-3.77 (m, 2H), 3.20-3.33 (m, 1H), 2.47-2.73 (m, 4H), 1.40 (d, J=6.45 Hz, 3H); $^{13}$C NMR (75 MHz, CHLOROFORM-d) δ ppm 145.71, 145.52, 140.84, 140.34, 140.14, 138.14, 129.32, 128.86, 128.64, 128.21, 128.08, 127.50, 127.09, 126.54, 125.26, 124.68, 119.85, 68.67, 61.82, 60.43, 57.98, 48.93, 36.51, 22.36.

Example 1.10 Synthesis of Compound 10 tert-butyl ((2S,3R)-3-hydroxy-1-phenyl-4-((2-phenylpropan-2-yl)amino)butan yl)carbamate (10A)

Reaction of (2S,3S)-3-[(tert-butoxycarbonyl)amino]-1,2-epoxy-4-phenylbutane (1.947 g, 7.396 mmol) with 2-phenylpropan-2-amine (1.000 g, 7.396 mmol) in the presence of a catalytic amount of pyridine in 15 mL of isopropanol was carried out as described in step 1. Purification: flash column chromatography (1-5% MeOH in DCM). Yield: 0.700 g (23.70%), TLC (DCM/MeOH, 9.5/0.5 v/v) $R_f$=0.36, MW 398.55, Formula: $C_{24}H_{34}N_2O_3$, MS m/z 399.42 (M+H$^+$), $^1$H NMR (500 MHz, CHLOROFORM-d) δ ppm 7.44 (d, J=7.45 Hz, 2H), 7.34 (t, J=7.45 Hz, 2H), 7.15-7.30 (m, 6H), 4.57 (d, J=8.59 Hz, 1H), 3.78 (br s, 1H), 3.44 (br s, 3H), 2.98 (dd, J=13.75, 4.01 Hz, 1H), 2.82 (dd, J=13.75, 7.45 Hz, 1H), 2.37-2.52 (m, 2H), 1.51-1.57 (m, 6H), 1.35 (s, 9H).

(2R,3S)-3-amino-4-phenyl-1-((2-phenylpropan-2-yl)amino)butan-2-ol (10B)

Reaction of tert-butyl ((2S,3R)-3-hydroxy-1-phenyl-4-((2-phenylpropan-2-yl)amino)butan-2-yl)carbamate (10A) (0.700 g, 1.756 mmol) with 5 mL of TFA in 4 mL of DCM was carried out as described in step 2. Purification: extraction (aqueous ammonia/DCM). Yield: 0.408 g (77.84%), TLC (DCM/MeOH/NH$_{3(aq)}$, 9.5/0.5/0.05 v/v/v) $R_f$=0.22, MW 298.43, Formula: $C_{19}H_{26}N_2O$, $^1$H NMR (500 MHz, CHLOROFORM-d) δ ppm 7.45 (dd, J=7.16, 1.15 Hz, 2H), 7.05-7.37 (m, 8H), 3.50-3.56 (m, 1H), 3.06 (dtd, J=9.49, 4.49, 4.49, 2.15 Hz, 1H), 2.86 (d, J=7.73 Hz, 1H), 2.76-2.82 (m, 1H), 2.64 (dt, J=11.89, 2.94 Hz, 1H), 2.63 (br s, 3H), 2.46 (ddd, J=11.74, 8.02, 2.29 Hz, 1H), 2.33-2.42 (m, 1H), 1.53 (s, 6H).

(2R,3S)-3-((9H-fluoren-9-yl)amino)-4-phenyl-1-((2-phenylpropan-2-yl)amino)butan-2-ol (10)

Reaction between (2R,3S)-3-amino-4-phenyl-1-((2-phenylpropan-2-yl)amino)butan-2-ol (10B) (150 mg, 0.5026 mmol) and 9-bromo-9H-fluorene (123 mg, 0.5026 mmol) in the presence of potassium carbonate (139 mg, 1.005 mmol) in 5 mL of acetonitrile was carried out as described in step 3. Purification: extraction (water/ethyl acetate), flash column chromatography (5% MeOH in DCM). Yield: 54 mg (23.22%), TLC (DCM/MeOH, 9/1 v/v) $R_f$=0.35, MW 462.64, Formula: $C_{32}H_{34}N_2O$, MS m/z 463.35 (M+H$^+$), $^1$H NMR (500 MHz, CHLOROFORM-d) δ ppm 7.61-7.70 (m, 2H), 7.14-7.44 (m, 14H), 6.98-7.03 (m, 2H), 4.86 (s, 1H), 3.71 (br s, 1H), 3.38 (br s, 1H), 2.52-2.73 (m, 5H), 1.47-1.61 (m, 8H); $^{13}$C NMR (126 MHz, CHLOROFORM-d) δ ppm 146.15, 145.93, 140.29, 129.45, 128.72, 128.62, 128.23, 127.64, 127.49, 127.26, 126.58, 126.02, 125.40, 124.68, 119.92, 119.87, 70.23, 61.98, 60.40, 53.54, 45.22, 36.26, 29.04.

Example 1.11 Synthesis of Compound 11

Synthesis of Intermediates tert-butyl ((2S,3S)-4-((cyclohexylmethyl)amino)-3-hydroxy-1-phenylbutan-2-yl)carbamate (11A)

Reaction of (2R,3S)-3-[(tert-butoxycarbonyl)amino]-1,2-epoxy-4-phenylbutane (1.5 g, 5.7034 mmol) with cyclohexylmethanamine (0.710 g, 6.2737 mmol) in the presence of a catalytic amount of pyridine in 40 mL of isopropanol was carried out as described in step 1. Purification: flash column chromatography (5% MeOH in DCM). Yield: 1.33 g (61.98%), TLC (DCM/MeOH, 9/1 v/v) $R_f$=0.38, MW 376.54, Formula: $C_{22}H_{36}N_2O_3$, MS m/z 377.35 (M+H$^+$), $^1$H NMR (500 MHz, CHLOROFORM-d) δ ppm 7.17-7.33 (m, 5H), 4.99 (d, J=9.17 Hz, 1H), 3.74 (q, J=8.02 Hz, 1H), 3.64 (dd, J=9.16, 3.44 Hz, 1H), 3.07 (br s, 2H), 2.85-2.98 (m, 2H), 2.56-2.69 (m, 2H), 2.38-2.51 (m, 2H), 1.63-1.76 (m, 5H), 1.36-1.45 (m, 9H), 1.08-1.35 (m, 4H), 0.82-0.95 (m, 2H).

(2S,3S)-3-amino-1-((cyclohexylmethyl)amino)-4-phenylbutan-2-ol (11B)

Reaction of tert-butyl ((2S,3S)-4-((cyclohexylmethyl)amino)-3-hydroxy-1-phenylbutan-2-yl)carbamate (11A) (1.33 g, 3.5322 mmol) with 3 mL of TFA in 2 mL of DCM was carried out as described in step 2. Purification: extraction (aqueous ammonia/DCM). Yield: 0.965 g (98.97%), TLC (DCM/MeOH, 9/1 v/v/v) $R_f$=0.25, MW 276.42, Formula: $C_{17}H_{28}N_2O$, MS m/z 277.26 (M+H$^+$), $^1$H NMR (500 MHz, CHLOROFORM-d) δ ppm 7.28-7.34 (m, 2H), 7.19-7.26 (m, 3H), 3.59 (dt, J=7.30, 3.51 Hz, 1H), 2.90-2.97 (m, 3H), 2.65-2.89 (m, 4H), 2.52-2.64 (m, 3H), 2.45 (dd, J=12.03, 6.87 Hz, 1H), 1.64-1.79 (m, 5H), 1.50 (dtt, J=14.43, 7.32, 7.32, 3.51, 3.51 Hz, 1H), 1.10-1.30 (m, 3H), 0.86-0.97 (m, 2H).

(2S,3S)-3-((9H-fluoren-9-yl)amino)-1-((cyclohexylmethyl)amino)-4-phenylbutan-2-ol (11)

Reaction between (2S,3S)-3-amino-1-((cyclohexylmethyl)amino)-4-phenylbutan-2-ol (11B) (150 mg, 0.5432 mmol) and 9-bromo-9H-fluorene (133 mg, 0.5432 mmol) in the presence of potassium carbonate (150 mg, 1.0864 mmol) in 5 mL of acetonitrile was carried out as described in step 3. Purification: extraction (water/ethyl acetate), flash column chromatography (5% MeOH in DCM). Yield: 119.2 mg (49.84%), TLC (DCM/MeOH, 9/1 v/v) $R_f$=0.34, MW 440.63, Formula: $C_{30}H_{36}N_2O$, MS m/z 441.29 (M+H$^+$), $^1$H NMR (500 MHz, CHLOROFORM-d) δ ppm 7.70 (t, J=7.16 Hz, 2H), 7.63 (dd, J=7.45, 1.15 Hz, 1H), 7.59 (d, J=7.45 Hz, 1H), 7.38 (td, J=7.30, 2.58 Hz, 2H), 7.25-7.34 (m, 4H), 7.13-7.23 (m, 3H), 4.96 (s, 1H), 3.52 (br s, 1H), 2.81-2.87 (m, 1H), 2.77 (dd, J=13.75, 4.58 Hz, 1H), 2.64 (br s, 1H), 2.53 (dd, J=13.17, 9.17 Hz, 2H), 2.37 (br s, 2H), 1.95 (d, J=11.46 Hz, 1H), 1.55-1.86 (m, 5H), 1.02-1.48 (m, 6H), 0.71-0.92 (m, 2H); $^{13}$C NMR (126 MHz, CHLOROFORM-d) δ ppm 144.52, 144.28, 141.15, 140.88, 139.22, 129.36, 128.54, 128.32, 128.28, 127.42, 127.01, 126.33, 125.57, 125.42, 120.22, 119.93, 69.57, 66.71, 54.51, 53.53, 41.10, 36.44, 31.84, 31.61, 31.03, 26.80, 26.18, 26.06.

Example 1.12 Synthesis of Compound 12

Synthesis of Intermediates tert-butyl ((2S,3S)-4-(tert-butylamino)-3-hydroxy-1-phenylbutan-2-yl)carbamate (12A)

Reaction of (2R,3S)-3-[(tert-butoxycarbonyl)amino]-1,2-epoxy-4-phenylbutane (1.5 g, 5.6961 mmol) with tert-butylamine (0.4586 g, 6.2657 mmol) in the presence of catalytic amounts of pyridine in 30 mL of n-propanol was carried out as described in step 1. Purification: flash column chromatography (2-8% MeOH in DCM). Yield: 0.9917 g (51.75%), TLC (DCM/MeOH, 9.5/0.5 v/v) $R_f$=0.13, MW 336.48, Formula: $C_{19}H_{32}N_2O_3$, MS m/z 337.54 (M+H$^+$), $^1$H NMR (300 MHz, CHLOROFORM-d) δ ppm 7.16-7.32 (m, 5H), 4.92-5.04 (m, 1H), 3.67-3.79 (m, 1H), 3.42 (dd, J=9.38, 2.34 Hz, 1H), 2.82-2.98 (m, 2H), 2.56-2.64 (m, 1H), 2.40-2.51 (m, 1H), 2.08 (br s, 2H), 1.41 (s, 9H), 1.05 (s, 9H).

(2S,3S)-3-amino-1-(tert-butylamino)-4-phenylbutan-2-ol (12B)

Reaction of tert-butyl ((2S,3S)-4-(tert-butylamino)-3-hydroxy-1-phenylbutan-2-yl)carbamate (12A) (0.685 g, 2.0358 mmol) with 3 mL of TFA in 1.5 mL of DCM was carried out as described in step 2. Purification: extraction (aqueous ammonia/DCM). Yield: 0.450 g (93.56%), TLC (DCM/MeOH, 9/1 v/v) $R_f$=0.17, MW 236.36, Formula: $C_{14}H_{24}N_2O$, MS m/z 237.32 (M+H$^+$), $^1$H NMR (500 MHz, CHLOROFORM-d) δ ppm 7.29-7.34 (m, 2H), 7.18-7.27 (m, 3H), 3.77 (br s, 4H), 3.67-3.71 (m, 1H), 3.09-3.14 (m, 1H), 2.91-3.00 (m, 2H), 2.78 (dd, J=12.03, 5.73 Hz, 1H), 2.64-2.71 (m, 1H), 1.23 (s, 9H).

(2S,3S)-3-((9H-fluoren-9-yl)amino)-1-(tert-butylamino)-4-phenylbutan-2-ol (12)

Reaction between (2S,3S)-3-amino-1-(tert-butylamino)-4-phenylbutan-2-ol (12B) (75 mg, 0.3175 mmol) and 9-bromo-9H-fluorene (77.8 mg, 0.3175 mmol) in the presence of potassium carbonate (87.7 mg, 0.6350 mmol) in 2.5 mL of acetonitrile was carried out as described in step 3. Purification: extraction (water/ethyl acetate), flash column chromatography (5% MeOH in DCM). Yield: 65 mg (51.14%), TLC (DCM/MeOH, 9/1 v/v) $R_f$=0.25, MW 400.57, Formula: $C_{27}H_{32}N_2O$, MS m/z 401.34 (M+H$^+$), $^1$H NMR (300 MHz, CHLOROFORM-d) δ ppm 7.71 (dd, J=7.33, 4.40 Hz, 2H), 7.51 (dd, J=16.41, 7.03 Hz, 2H), 7.35-7.43 (m, 2H), 7.24-7.33 (m, 4H), 7.11-7.24 (m, 3H), 4.95 (s, 1H), 3.63 (br s, 3H), 3.54-3.62 (m, 1H), 3.12-3.20 (m, 1H), 2.80-3.02 (m, 3H), 2.59 (dd, J=11.72, 5.86 Hz, 1H), 0.96 (s, 9H); $^{13}$C NMR (75 MHz, CHLOROFORM-d) δ ppm 145.81, 145.51, 140.63, 140.27, 138.87, 129.39, 128.60, 128.37, 128.32, 127.53, 127.32, 126.34, 125.33, 124.89, 120.08, 119.93, 68.07, 61.25, 60.78, 52.51, 45.84, 38.28, 27.61.

Example 1.13 Synthesis of Compound 13 tert-butyl ((2S,3R)-3-hydroxy-4-(neopentylamino)-1-phenylbutan-2-yl)carbamate (13A)

Reaction of (2S,3S)-3-[(tert-butoxycarbonyl)amino]-1,2-epoxy-4-phenylbutane (3.020 g, 11.47 mmol) with 2,2-dimethylpropan-1-amine (1.0 g, 11.47 mmol)) in the presence of a catalytic amount of pyridine in 30 mL of n-propanol was carried out as described in step 1. Purification: flash column chromatography (5% MeOH in DCM). Yield: 2.981 g (74.17%), TLC (DCM/MeOH, 9.5/0.5 v/v) $R_f$=0.22, MW 350.50, Formula: $C_{20}H_{34}N_2O_3$, $^1$H NMR (500

MHz, CHLOROFORM-d) δ ppm 7.28-7.32 (m, 2H), 7.20-7.27 (m, 3H), 4.79 (d, J=9.16 Hz, 1H), 3.86 (br s, 1H), 3.46-3.53 (m, 1H), 3.01 (dd, J=14.03, 4.87 Hz, 1H), 2.86-2.94 (m, 1H), 2.68-2.82 (m, 2H), 2.88 (br s, 2H), 2.34-2.44 (m, 2H), 1.37 (s, 9H), 0.95 (s, 9H).

(2R,3S)-3-amino-1-(neopentylamino)-4-phenylbutan-2-ol (13B)

The reaction of tert-butyl ((2S,3R)-3-hydroxy-4-(neopentylamino)-1-phenylbutan-2-yl)carbamate (13A) (1.0 g, 3.9938 mmol) with 3 mL of TFA in 1.5 mL of DCM was carried out as described in step 2. Purification: extraction (aqueous ammonia/DCM). Yield: 0.5557 g (77.79%), TLC (DCM/MeOH, 9/1 v/v) $R_f$=0.22, MW 250.39, Formula: $C_{15}H_{26}N_2O$, MS m/z 251.28 (M+H$^+$), $^1$H NMR (500 MHz, CHLOROFORM-d) δ ppm 7.30-7.35 (m, 2H), 7.20-7.26 (m, 3H), 3.63-3.71 (m, 1H), 3.15-3.21 (m, 1H), 2.97-3.00 (m, 1H), 2.96 (d, J=4.01 Hz, 1H), 2.83 (dd, J=12.03, 8.02 Hz, 1H), 2.70 (br s, 4H), 2.47-2.54 (m, 2H), 2.40-2.44 (m, 1H), 0.96 (s, 9H).

(2R,3S)-3-((9H-fluoren-9-yl)amino)-1-(neopentylamino)-4-phenylbutan-2-ol (13)

Reaction between (2R,3S)-3-amino-1-(neopentylamino)-4-phenylbutan-2-ol (13B) (120 mg, 0.4790 mmol) and 9-bromo-9H-fluorene (117 mg, 0.4790 mmol) in the presence of potassium carbonate (132 mg, 0.9580 mmol) in 4 mL of acetonitrile was carried out as described in step 3. Purification: extraction (water/ethyl acetate), flash column chromatography (5% MeOH in DCM). Yield: 25.8 mg (13.0%), TLC (DCM/MeOH, 9/1 v/v) $R_f$=0.33, MW 414.27, Formula: $C_{28}H_{34}N_2O$, MS m/z 415.37 (M+H$^+$), $^1$H NMR (500 MHz, CHLOROFORM-d) δ ppm 7.62-7.73 (m, 4H), 7.27-7.41 (m, 3H), 7.20-7.26 (m, 2H), 7.09-7.19 (m, 3H), 6.88-7.04 (m, 1H), 4.96 (s, 1H), 4.75-5.22 (m, 5H), 3.03-3.23 (m, 1H), 2.54 (br s, 2H), 1.91-1.99 (m, 3H), 0.75-1.19 (m, 9H); $^{13}$C NMR (126 MHz, CHLOROFORM-d) δ ppm 144.61, 144.15, 140.65, 138.78, 129.97, 129.37, 128.55, 128.44, 128.31, 127.59, 127.03, 126.35, 125.25, 120.36, 119.98, 70.32, 60.49, 55.16, 53.52, 38.87, 28.70, 21.15, 14.29.

Example 1.14 Synthesis of Compound 14

Synthesis of Intermediates tert-butyl ((2S,3R)-3-hydroxy-1-phenyl-4-((2,2,2-trifluoroethyl)amino)butan-2-yl)carbamate (14A)

Reaction of (2S,3S)-3-[(tert-butoxycarbonyl)amino]-1,2-epoxy-4-phenylbutane (1.5 g, 5.6961 mmol) with 2,2,2-trifluoroethane-1-amine (1.242 g, 12.5314 mmol) in the presence of a catalytic amount of pyridine in 45 mL of isopropanol was carried out as described in step 1. Purification: flash column chromatography (5% MeOH in DCM). Yield: 0.980 g (47.42%), TLC (DCM/MeOH, 9.5/0.5 v/v) $R_f$=0.5, MW 362.39, Formula: $C_{17}H_{25}F_3N_2O_3$, MS m/z 363.26 (M+H$^+$), $^1$H NMR (500 MHz, CHLOROFORM-d) δ ppm 7.29-7.34 (m, 2H), 7.19-7.26 (m, 3H), 4.53 (d, J=9.16 Hz, 1H), 3.77-3.85 (m, 1H), 3.47 (ddd, J=7.45, 5.44, 3.72 Hz, 1H), 3.17-3.28 (m, 2H), 3.02 (dd, J=13.75, 4.58 Hz, 1H), 2.84-2.97 (m, 2H), 2.75-2.82 (m, 1H), 2.15 (br s, 1H), 1.37 (s, 9H), NH signal was not registered.

(2R,3S)-3-amino-4-phenyl-1-((2,2,2-trifluoroethyl)amino)butan-2-ol (14B)

Reaction of tert-butyl ((2S,3R)-3-hydroxy-1-phenyl-4-((2,2,2-trifluoroethyl)amino)butan-2-yl)carbamate (14A) (1.1 g, 3.0354 mmol) with 3 mL of TFA in 1.5 mL of DCM was carried out as described in step 2. Purification: extraction (aqueous ammonia/DCM). Yield: 0.588 g (73.86%), TLC (DCM/MeOH, 9/1 v/v) $R_f$=0.26, MW 262.28, Formula: $C_{12}H_{17}F_3N_2O$, $^1$H NMR (500 MHz, CHLOROFORM-d) δ ppm 7.29-7.37 (m, 2H), 7.17-7.28 (m, 3H), 3.60 (ddd, J=8.02, 4.58, 3.44 Hz, 1H), 3.19-3.28 (m, 2H), 3.16 (dt, J=10.17, 4.37 Hz, 1H), 2.95-3.01 (m, 1H), 2.83-2.94 (m, 2H), 2.50 (dd, J=13.46, 10.02 Hz, 1H), 1.69 (br s, 4H).

(2R,3S)-3-((9H-fluoren-9-yl)amino)-4-phenyl-1-((2,2,2-trifluoroethyl)amino)butan-2-ol (14)

The reaction between (2R,3S)-3-amino-4-phenyl-1-((2,2,2-trifluoroethyl)amino)butan-2-ol (14B) (150 mg, 0.5725 mmol) and 9-bromo-9H-fluorene (140 mg, 0.5725 mmol) in the presence of potassium carbonate (158 mg, 1.145 mmol) in 5 mL of acetonitrile was carried out as described in step 3. Purification: extraction (water/ethyl acetate), flash column chromatography (5% MeOH in DCM), preparative HPLC (acetonitrile/water 20-90%). Yield: 67 mg (27.46%), TLC (DCM/MeOH, 9/1 v/v) $R_f$=0.65, MW 426.48, Formula: $C_{25}H_{25}F_3N_2O$, MS m/z 427.26 (M+H$^+$), $^1$H NMR (500 MHz, CHLOROFORM-d) δ ppm 6.86-7.69 (m, 13H), 4.77 (s, 1H), 3.38-3.52 (m, 2H), 2.98-3.17 (m, 3H), 2.83 (dd, J=12.03, 8.02 Hz, 1H), 2.67-2.75 (m, 2H), 2.58 (dd, J=14.32, 9.16 Hz, 1H), 1.74 (br s, 2H); $^{13}$C NMR (126 MHz, CHLOROFORM-d) δ ppm 141.80, 141.18, 137.80, 135.69, 135.51, 130.82, 130.62, 129.08, 129.01, 128.99, 128.86, 128.78, 128.76, 127.79, 127.49, 127.36, 120.77, 120.73, 122.36 (q, J=285.00 Hz), 67.08, 60.40, 59.75, 59.32, 49.62, 32.79.

Example 1.15 Synthesis of Compound 15

Synthesis of Intermediates tert-butyl ((2S,3S)-4-((cyclopropylmethyl)amino)-3-hydroxy-1-phenylbutan-2-yl)carbamate (15A)

Reaction of (2R,3S)-3-[(tert-butoxycarbonyl)amino]-1,2-epoxy-4-phenylbutane (2.000 g, 7.594 mmol) with cyclopropylmethanamine (0.540 g, 7.594 mmol) in the presence of a catalytic amount of pyridine in 20 mL of isopropanol was carried out as described in step 1. Purification: flash column chromatography (DCM/MeOH/NH$_{3(aq)}$, 9.5/0.5/0.05 v/v/v). Yield: 1.007 g (39.6%), TLC (DCM/MeOH/NH$_{3(aq)}$, 9.5/0.5/0.05 v/v/v) $R_f$=0.32, MW 334.46, Formula: $C_{19}H_{30}N_2O_3$, $^1$H NMR (500 MHz, CHLOROFORM-d) δ ppm 7.15-7.31 (m, 5H), 4.98 (d, J=9.16 Hz, 1H), 3.66-3.76 (m, 1H), 3.53-3.60 (m, 1H), 2.84-2.99 (m, 2H), 2.54-2.69 (m, 2H), 2.36-2.47 (m, 2H), 2.22 (br s, 2H), 1.39 (s, 9H), 0.83-0.93 (m, 1H), 0.44 (d, J=7.45 Hz, 2H), 0.07 (d, J=4.58 Hz, 2H).

(2S,3S)-3-amino-1-((cyclopropylmethyl)amino)-4-phenylbutan-2-ol (15B)

Reaction of tert-butyl ((2S,3S)-4-((cyclopropylmethyl)amino)-3-hydroxy-1-phenylbutan yl)carbamate (15A) (0.600 g, 1.795 mmol) with 3 mL of TFA in 1 mL of DCM was carried out as described in step 2. Purification: extraction (aqueous ammonia/DCM). Yield: 0.2997 g (71.29%), TLC (DCM/MeOH/NH$_{3(aq)}$, 9/1/0.1 v/v/v) R$_f$=0.19, MW 234.34, Formula: C$_{14}$H$_{22}$N$_2$O, $^1$H NMR (500 MHz, CHLOROFORM-d) δ ppm 7.26-7.34 (m, 2H), 7.15-7.24 (m, 3H), 4.09 (br s, 1H), 3.28-3.41 (m, 2H), 3.16 (br s, 2H), 2.95-3.05 (m, 2H), 2.81-2.94 (m, 2H), 2.70-2.77 (m, 1H), 1.23 (s, 1H), 1.07-1.19 (m, 1H), 0.74-0.89 (m, 1H), 0.59-0.67 (m, 2H), 0.22-0.39 (m, 2H).

(2S,3S)-3-((9H-fluoren-9-yl)amino)-1-((cyclopropylmethyl)amino)-4-phenylbutan-2-ol (15)

Reaction between (2S,3S)-3-amino-1-((cyclopropylmethyl)amino)-4-phenylbutan-2-ol (15B) (150 mg, 0.6401 mmol) and 9-bromo-9H-fluorene (157 mg, 0.6401 mmol) in the presence of potassium carbonate (177 mg, 1.280 mmol) in 5 mL of acetonitrile was carried out as described in step 3. Purification: water/ethyl acetate extraction, flash column chromatography (5% MeOH in DCM). Yield: 103.4 mg (40.56%), TLC (DCM/MeOH, 9/1 v/v) R$_f$=0.4, MW 398.55, Formula: C$_{27}$H$_{30}$N$_2$O, MS m/z 399.25 (M+H$^+$), $^1$H NMR (500 MHz, CHLOROFORM-d) δ ppm 7.68 (dd, J=7.45, 5.16 Hz, 2H), 7.60 (dd, J=12.03, 7.45 Hz, 2H), 7.37 (t, J=7.40 Hz, 2H), 7.23-7.32 (m, 4H), 7.14-7.21 (m, 3H), 5.11 (s, 1H), 3.60 (dt, J=8.88, 4.15 Hz, 1H), 2.88 (dt, J=8.74, 4.51 Hz, 1H), 2.82 (dd, J=13.17, 5.16 Hz, 1H), 2.77 (m, J=10.90 Hz, 1H), 2.62-2.71 (m, 1H), 2.58 (dd, J=13.17, 8.59 Hz, 1H), 2.51 (dd, J=12.60, 6.30 Hz, 1H), 2.28 (dd, J=12.32, 6.59 Hz, 1H), 1.65 (br s, 3H), 0.79-0.92 (m, 1H), 0.35-0.51 (m, 2H), −0.05-0.08 (m, 2H); $^{13}$C NMR (126 MHz, CHLOROFORM-d) δ ppm 144.68, 144.42, 141.03, 140.86, 139.25, 129.38, 128.57, 128.30, 128.28, 127.41, 127.11, 126.35, 125.46, 125.37, 120.17, 119.95, 69.55, 67.42, 56.92, 55.38, 54.87, 41.28, 10.95, 4.83, 3.85.

Example 1.16 Synthesis of Compound 16

Synthesis of Intermediates tert-butyl ((2S,3R)-4-((cyclopropylmethyl)amino)-3-hydroxy-1-phenylbutan yl)carbamate (16A)

Reaction of (2S,3S)-3-[(tert-butoxycarbonyl)amino]-1,2-epoxy-4-phenylbutane (2.000 g, 7.594 mmol) with cyclopropylmethanamine (0.540 g, 7.594 mmol) in the presence of a catalytic amount of pyridine in 20 mL of isopropanol was carried out as described in step 1. Purification: flash column chromatography (DCM/MeOH/NH$_{3(aq)}$, 9.5/0.5/0.05 v/v/v). Yield: 1.116 g (43.9%), TLC (DCM/MeOH/NH$_{3(aq)}$, 9.5/0.5/0.05 v/v/v) R$_f$=0.32, MW 334.46, Formula: C$_{19}$H$_{30}$N$_2$O$_3$, MS m/z 335.39 (M+H$^+$), $^1$H NMR (300 MHz, CHLOROFORM-d) δ ppm 7.15-7.34 (m, 5H), 4.65 (d, J=8.59 Hz, 1H), 3.81-3.96 (m, 1H), 3.51-3.64 (m, 1H), 2.71-3.18 (m, 6H), 2.42-2.59 (m, 1H), 1.31-1.38 (m, 10H), 1.01-1.12 (m, 1H), 0.49-0.67 (m, 2H), 0.25 (d, J=1.72 Hz, 2H).

(2R,3S)-3-amino-1-((cyclopropylmethyl)amino)-4-phenylbutan-2-ol (16B)

Reaction of tert-butyl ((2S,3R)-4-((cyclopropylmethyl)amino)-3-hydroxy-1-phenylbutan-2-yl)carbamate (16A) (0.600 g, 1.795 mmol) with 3 mL of TFA in 1 mL DCM was carried out as described in step 2. Purification: extraction (aqueous ammonia/DCM). Yield: 0.284 g (67.56%), TLC (DCM/MeOH/NH$_{3(aq)}$, 9/1/0.1 v/v/v) R$_f$=0.19, MW 234.34, Formula: C$_{14}$H$_{22}$N$_2$O, MS m/z 235.26 (M+H$^+$), $^1$H NMR (500 MHz, CHLOROFORM-d) δ ppm 7.28-7.34 (m, 2H), 7.18-7.27 (m, 3H), 3.68 (ddd, J=8.45, 4.73, 3.44 Hz, 1H), 3.11-3.17 (m, 1H), 2.92-2.97 (m, 2H), 2.79-2.85 (m, 1H), 2.45-2.72 (m, 8H), 0.94-1.03 (m, 1H), 0.47-0.56 (m, 2H), 0.14-0.20 (m, 1H).

(2R,3S)-3-((9H-fluoren-9-yl)amino)-1-((cyclopropylmethyl)amino)-4-phenylbutan-2-ol (JT-3) (16)

Reaction between (2R,3S)-3-amino-1-((cyclopropylmethyl)amino)-4-phenylbutan-2-ol (16B) (150 mg, 0.6401 mmol) and 9-bromo-9H-fluorene (157 mg, 0.6401 mmol) in the presence of potassium carbonate (177 mg, 1.280 mmol) in 5 mL of acetonitrile was carried out as described in step 3. Purification: extraction (water/ethyl acetate), flash column chromatography (5% MeOH in DCM). Yield: 60.1 mg (23.58%), TLC (DCM/MeOH, 9/1 v/v) R$_f$=0.4, MW 398.55, Formula: C$_{27}$H$_{30}$N$_2$O, MS m/z 399.15 (M+H$^+$), $^1$H NMR (500 MHz, CHLOROFORM-d) δ ppm 7.71 (t, J=7.45 Hz, 2H), 7.65 (dd, J=16.90, 7.16 Hz, 2H), 7.40 (t, J=7.40 Hz, 2H), 7.34 (td, J=7.40, 1.15 Hz, 1H), 7.25-7.32 (m, 3H), 7.16-7.23 (m, 3H), 5.14 (s, 1H), 3.63 (m, 1H), 2.97-3.11 (m, 2H), 2.91 (dd, J=13.46, 3.72 Hz, 1H), 2.60-2.71 (m, 1H), 2.56 (dd, J=12.89, 6.59 Hz, 1H), 2.48 (dd, J=13.75, 9.74 Hz, 1H), 2.28 (dd, J=12.03, 6.30 Hz, 1H), 1.40 (br s, 3H), 0.83-0.97 (m, 1H), 0.48-0.56 (m, 1H), 0.44 (tt, J=8.38, 4.51 Hz, 1H), −0.04-0.12 (m, 2H); $^{13}$C NMR (126 MHz, CHLOROFORM-d) δ ppm 144.61, 144.24, 141.07, 140.86, 139.06, 129.40, 128.61, 128.36, 128.31, 127.52, 127.13, 126.40, 125.54, 125.37, 120.23, 119.93, 69.99, 67.27, 56.59, 55.74, 54.12, 39.44, 10.92, 5.06, 3.72.

Example 1.17 Synthesis of Compound 17

Synthesis of Intermediates—as in Example 1.2

N-((2S,3S)-4-(benzylamino)-3-hydroxy-1-phenylbutan-2-yl)-2-(9H-fluorene-9-yl)acetamide (17)

The reaction between (2S,3S)-3-amino-1-(benzylamino)-4-phenylbutan-2-ol (2B) (180 mg, 0.6662 mmol) and 9H-fluorene-9-acetic acid (149 mg, 0.6662 mmol) in the presence of DMAP (41 mg, 0.3331 mmol), HOBt (117 mg, 0.8661 mmol) and EDC (166 mg, 0.8661 mmol) in 10 mL of dichloromethane was carried out as described in step 4. Purification: extraction (water/DCM), flash column chromatography (5% MeOH in DCM). Yield: 53.1 mg (16.73%), TLC (DCM/MeOH, 9/1 v/v) R$_f$=0.39, MW 476.62, Formula: C$_{32}$H$_{32}$N$_2$O$_2$, MS m/z 477.31 (M+H$^+$), $^1$H NMR (500 MHz, METHANOL-d$_4$) δ ppm 7.75 (d, J=7.45 Hz, 2H), 7.41 (d, J=7.45 Hz, 1H), 7.17-7.36 (m, 15H), 4.23-4.29 (m, 2H), 3.85 (ddd, J=8.02, 5.73, 2.29 Hz, 1H), 3.79 (d, J=1.15 Hz, 2H), 2.93 (dd, J=13.75, 5.73 Hz, 1H), 2.80 (dd, J=13.75, 9.17 Hz, 1H), 2.58-2.69 (m, 3H), 2.56 (dd, J=15.47, 7.45 Hz, 1H), NH, CONH, OH were not registered; $^{13}$C NMR (126 MHz, METHANOL-d$_4$) δ ppm 172.89, 146.43, 140.64, 128.99, 128.53, 128.32, 128.18, 127.37, 127.07, 127.02, 126.82, 126.16, 124.22, 119.50, 69.61, 53.31, 52.81, 51.00, 43.59, 39.48, 37.16.

Example 1.18 Synthesis of Compound 18

Synthesis of Intermediates—as in Example 1.5

N-((2S,3S)-4-((4-(tert-butyl)benzyl)amino)-3-hydroxy-1-phenylbutan-2-yl)-9H-fluorene-9-carboxamide (18)

Reaction between (2S,3S)-3-amino-1-((4-(tert-butyl)benzyl)amino)-4-phenylbutan-2-ol (5B) (150 mg, 0.4601 mmol) and 9H-fluorene-9-carboxylic acid (97 mg, 0.4601 mmol) in the presence of DMAP (28 mg, 0.2301 mmol), HOBt (81 mg, 0.5981 mmol) and EDC (115 mg, 0.5981 mmol) in 8 mL of dichloromethane was carried out as described in step 4. Purification: extraction (water/DCM), flash column chromatography (5% MeOH in DCM), preparative HPLC (acetonitrile/water gradient 20-90%). Yield: 23.3 mg (9.77%), TLC (DCM/MeOH, 9/1 v/v) $R_f$=0.38, MW 518.70, Formula: $C_{35}H_{38}N_2O_2$, MS m/z 519.32 (M+H$^+$), $^1$H NMR (500 MHz, CHLOROFORM-d) δ ppm 7.74 (d, J=7.45 Hz, 2H), 7.47 (d, J=7.45 Hz, 1H), 7.37-7.44 (m, 2H), 7.24-7.36 (m, 5H), 7.11-7.22 (m, 5H), 7.01-7.06 (m, 2H), 5.62 (d, J=9.17 Hz, 1H), 4.68 (s, 1H), 4.05 (q, J=9.20 Hz, 1H), 3.56 (s, 3H), 3.43 (br s, 2H), 2.65-2.74 (m, 2H), 2.55 (dd, J=12.03, 4.01 Hz, 1H), 2.27 (dd, J=12.03, 9.74 Hz, 1H), 1.29 (s, 9H); $^{13}$C NMR (126 MHz, CHLOROFORM-d) δ ppm 171.02, 150.71, 141.72, 141.45, 141.25, 137.83, 129.34, 128.47, 128.39, 128.25, 127.85, 127.68, 126.50, 125.64, 125.47, 125.04, 120.45, 120.36, 68.64, 56.20, 52.84, 52.30, 51.35, 38.17, 34.62, 31.41.

Example 1.19 Synthesis of Compound 19

Synthesis of Intermediates—as in Example 1.5

N-((2S,3S)-4-((4-(tert-butyl)benzyl)amino)-3-hydroxy-1-phenylbutan-2-yl)-2-(9H-fluoren-9-yl)acetamide (19)

Reaction between (2S,3S)-3-amino-1-((4-(tert-butyl)benzyl)amino)-4-phenylbutan-2-ol (5B) (200 mg, 0.6135 mmol) and 9H-fluorene-9-acetic acid (138 mg, 0.6135 mmol) in the presence of DMAP (37 mg, 0.3068 mmol), HOBt (108 mg, 0.7976 mmol) and EDC (153 mg, 0.7976 mmol) in 10 mL of dichloromethane was carried out as described in step 4. Purification: extraction (water/DCM), flash column chromatography (5% MeOH in DCM). Yield: 119.4 mg (36.56%), TLC (DCM/MeOH, 9/1 v/v) $R_f$=0.38, MW 532.73, Formula: $C_{36}H_{40}N_2O_2$, MS m/z 533.41 (M+H$^+$), $^1$H NMR (500 MHz, CHLOROFORM-d) δ ppm 7.75 (d, J=8.02 Hz, 2H), 7.47 (d, J=7.45 Hz, 1H), 7.16-7.40 (m, 14H), 5.92 (d, J=9.17 Hz, 1H), 4.40 (t, J=6.59 Hz, 1H), 4.11 (q, J=8.40 Hz, 1H), 3.74-3.80 (m, 1H), 3.64-3.73 (m, 2H), 2.82 (d, J=7.45 Hz, 2H), 2.71 (dd, J=15.47, 6.87 Hz, 1H), 2.66 (dd, J=15.47, 7.45 Hz, 1H), 2.55 (dd, J=12.03, 4.01 Hz, 1H), 2.43-2.51 (m, 1H), 1.28 (s, 9H), NH, OH were not registered; $^{13}$C NMR (126 MHz, CHLOROFORM-d) δ ppm 171.31, 150.77, 146.45, 146.36, 140.93, 140.84, 138.11, 134.89, 129.50, 128.61, 128.28, 127.53, 127.51, 127.43, 127.21, 126.60, 125.66, 124.58, 124.53, 120.10, 68.08, 52.79, 52.54, 51.51, 43.81, 40.30, 38.58, 34.61, 31.39.

Example 1.20 Synthesis of Compound 20

Synthesis of Intermediates—as in Example 1.7

2-(9H-fluorene-9-yl)-N-((2S,3S)-3-hydroxy-4-((2-methoxybenzyl)amino)-1-phenylbutan-2-yl)acetamide (20)

Reaction between (2S,3S)-3-amino-1-((2-methoxybenzyl)amino)-4-phenylbutan-2-ol (7B) (300 mg, 0.9994 mmol) and 9H-fluorene-9-acetic acid (138 mg, 0.9994 mmol) in the presence of DMAP (61 mg, 0.4997 mmol), HOBt (176 mg, 1.2992 mmol) and EDC (249 mg, 1.2992 mmol) in 10 mL of dichloromethane was carried out as described in step 4. Purification: extraction (water/DCM), flash column chromatography (5% MeOH in DCM). Yield: 110.8 mg (22.15%), TLC (DCM/MeOH, 9/1 v/v) $R_f$=0.44, MW 506.65, Formula: $C_{33}H_{34}N_2O_3$, MS m/z 507.63 (M+H$^+$), $^1$H NMR (500 MHz, CHLOROFORM-d) δ ppm 7.70 (d, J=7.45 Hz, 2H), 7.44 (d, J=7.45 Hz, 1H), 7.30-7.36 (m, 3H), 7.17-7.28 (m, 8H), 7.04 (dd, J=7.45, 1.72 Hz, 1H), 6.79-6.87 (m, 2H), 6.24 (d, J=9.16 Hz, 1H), 4.72 (br s, 2H), 4.40 (t, J=7.16 Hz, 1H), 4.11-4.18 (m, 1H), 3.76 (s, 3H), 3.63-3.74 (m, 3H), 2.84 (d, J=8.02 Hz, 2H), 2.66 (dd, J=15.47, 6.87 Hz, 1H), 2.54-2.62 (m, 2H), 2.50 (dd, J=12.03, 9.74 Hz, 1H); $^{13}$C NMR (126 MHz, CHLOROFORM-d) δ ppm 171.44, 157.69, 146.62, 146.53, 140.93, 140.77, 138.28, 130.55, 129.81, 129.61, 128.60, 127.40, 127.35, 127.11, 126.57, 124.61, 124.59, 120.78, 120.03, 120.00, 110.60, 67.88, 55.40, 52.78, 51.58, 48.60, 43.82, 40.34, 38.49.

Example 1.21 Synthesis of Compound 21

Synthesis of Intermediates—as in Example 1.8

2-(9H-fluoren-9-yl)-N-((2S,3R)-3-hydroxy-1-phenyl-4-((3-(trifluoromethyl)benzyl)-amino)butan-2-yl)acetamide (21)

Reaction between (2R,3S)-3-amino-4-phenyl-1-((3-(trifluoromethyl)benzyl)amino)butan-2-ol (8B) (314 mg, 0.9280 mmol) and 9H-fluorene-9-acetic acid (208 mg, 0.9280 mmol) in the presence of DMAP (57 mg, 0.4640 mmol), HOBt (163 mg, 1.2064 mmol) and EDC (231 mg, 1.2064 mmol) in 10 mL of dichloromethane was carried out as described in step 4. Purification: extraction (water/DCM), twice with flash column chromatography (5% MeOH in DCM). Yield: 130.0 mg (25.72%), TLC (DCM/MeOH, 9/1 v/v) $R_f$=0.5, MW 544.62, Formula: $C_{33}H_{31}F_3N_2O_2$, MS m/z 545.11 (M+H$^+$), $^1$H NMR (500 MHz, CHLOROFORM-d) δ ppm 7.74 (br d, J=5.16 Hz, 2H), 7.44-7.55 (m, 3H), 7.32-7.43 (m, 5H), 7.16-7.31 (m, 7H), 5.71 (d, J=9.16 Hz, 1H), 4.42 (t, J=6.59 Hz, 1H), 4.11 (q, J=8.02 Hz, 1H), 3.63-3.79 (m, 2H), 3.53 (d, J=6.87 Hz, 1H), 2.75-2.87 (m, 2H), 2.61-2.72 (m, 2H), 2.52 (dd, J=12.03, 3.44 Hz, 1H), 2.31 (t, J=10.30 Hz, 1H), 2.53 (br s, 2H); $^{13}$C NMR (126 MHz, CHLOROFORM-d) δ ppm 171.02, 146.30, 146.22, 140.93, 140.85, 140.43, 137.99, 131.52, 131.51, 130.92 (q, J=32.00 Hz), 129.43, 129.03, 128.63, 127.61, 127.55, 127.46, 127.20, 126.62, 124.83 (q, J=3.62 Hz), 124.54, 124.47, 124.25 (q, J=4.20 Hz), 122.01 (q, J=273.40 Hz), 120.13, 120.09, 68.31, 53.02, 52.28, 51.89, 43.82, 40.31, 38.65.

Example 1.22 Synthesis of Compound 22

Synthesis of Intermediates—as in Example 1.9

N-((2S,3R)-3-hydroxy-1-phenyl-4-(((S)-1-phenylethyl)amino)butan-2-yl)-9H-fluorene-9-carboxamide (22)

Reaction between (2R,3S)-3-amino-4-phenyl-1-(((S)-1-phenylethyl)amino)butan-2-ol (9B) (200 mg, 0.7032 mmol) and 9H-fluorene-9-carboxylic acid (148 mg, 0.7032 mmol) in the presence of DMAP (43 mg, 0.3516 mmol), HOBt (124 mg, 0.9142 mmol) and EDC (175 mg, 0.9142 mmol) in 10 mL of dichloromethane was carried out as described in step 4. Purification: extraction (water/DCM), flash column chromatography (5% MeOH in DCM). Yield: 107.8 mg (32.16%), TLC (DCM/MeOH, 9/1 v/v) $R_f$=0.37, MW 476.62, Formula: $C_{32}H_{32}N_2O_2$, MS m/z 477.52 (M+H$^+$), $^1$H NMR (500 MHz, CHLOROFORM-d) δ ppm 7.73 (dd, J=15.18, 7.73 Hz, 2H), 7.44 (t, J=7.45 Hz, 1H), 7.37 (t, J=7.45 Hz, 1H), 7.08-7.33 (m, 12H), 6.77-6.87 (m, 2H), 5.62 (d, J=8.59 Hz, 1H), 4.64 (s, 1H), 4.10-4.19 (m, 1H), 3.41-3.61 (m, 1H), 3.25 (dt, J=7.16, 3.87 Hz, 1H), 2.65 (dd, J=14.03, 4.87 Hz, 1H), 2.39-2.49 (m, 2H), 2.29 (dd, J=12.60, 4.58 Hz, 1H), 1.88-1.96 (m, 1H), 1.55-1.71 (m, 1H) 1.28 (d, J=6.87 Hz, 3H); $^{13}$C NMR (126 MHz, CHLOROFORM-d) δ ppm 171.63, 141.57, 141.27, 141.22, 137.20, 129.23, 128.69, 128.48, 127.85, 127.49, 126.95, 126.48, 125.65, 124.95, 120.35, 70.28, 58.96, 56.31, 48.92, 36.54, 34.05, 25.06.

Example 1.23 Synthesis of Compound 23

Synthesis of Intermediates—as in Example 1.9

2-(9H-fluoren-9-yl)-N-((2S,3R)-3-hydroxy-1-phenyl-4-(((S)-1-phenylethyl)amino)butan-2-yl)acetamide (23)

Reaction between (2R,3S)-3-amino-4-phenyl-1-(((S)-1-phenylethyl)amino)butan-2-ol (9B) (150 mg, 0.5274 mmol) and 9H-fluorene-9-acetic acid (118 mg, 0.5274 mmol) in the presence of DMAP (32 mg, 0.2637 mmol), HOBt (93 mg, 0.6856 mmol) and EDC (131 mg, 0.6856 mmol) in 8 mL of dichloromethane was carried out as described in step 4. Purification: extraction (water/DCM), flash column chromatography (5% MeOH in DCM). Yield: 77.0 mg (29.76%), TLC (DCM/MeOH, 9/1 v/v) R$_f$=0.38, MW 490.65, Formula: $C_{33}H_{34}N_2O_2$, MS m/z 491.56 (M+H$^+$), $^1$H NMR (500 MHz, CHLOROFORM-d) δ ppm 7.72 (dd, J=7.45, 4.58 Hz, 2H), 6.97-7.43 (m, 16H), 5.83 (br d, J=28.10 Hz, 1H), 4.38 (t, J=6.87 Hz, 1H), 4.16-4.27 (m, 1H), 3.64-3.72 (m, 1H), 3.32-3.43 (m, 1H), 2.78-2.88 (m, 1H), 2.46-2.65 (m, 4H), 2.77 (br s, 2H), 2.26-2.39 (m, 1H), 1.31-1.41 (m, 3H); $^{13}$C NMR (126 MHz, CHLOROFORM-d) δ ppm 171.61, 146.42, 140.77, 140.75, 137.90, 129.27, 128.71, 128.60, 127.51, 127.49, 127.44, 127.38, 127.29, 126.80, 126.56, 124.58, 120.01, 119.99, 70.62, 58.60, 53.96, 49.06, 43.76, 40.67, 36.78, 24.11.

Example 1.24 Synthesis of Compound 24

Synthesis of Intermediates—as in Example 1.10

N-((2S,3R)-3-hydroxy-1-phenyl-4-((2-phenylpropan-2-yl)amino)butan-2-yl)-9H-fluorene-9-carboxamide (24)

Reaction between (2R,3S)-3-amino-4-phenyl-1-((2-phenylpropan-2-yl)amino)butan-2-ol (10B) (150 mg, 0.5026 mmol) and 9H-fluorene-9-carboxylic acid (106 mg, 0.5026 mmol) in the presence of DMAP (31 mg, 0.2513 mmol), HOBt (88 mg, 0.6534 mmol) and EDC (125 mg, 0.6534 mmol) in 8 mL of dichloromethane was carried out as described in step 4. Purification: extraction (water/DCM), flash column chromatography (5% MeOH in DCM). Yield: 68.14 mg (27.63%), TLC (DCM/MeOH, 9/1 v/v) R$_f$=0.45, MW 490.65, Formula: $C_{33}H_{34}N_2O_2$, MS m/z 491.54 (M+H$^+$), $^1$H NMR (500 MHz, CHLOROFORM-d) δ ppm 7.73 (dd, J=13.75, 7.45 Hz, 2H), 7.41-7.48 (m, 2H), 7.35-7.40 (m, 3H), 7.28-7.34 (m, 3H), 7.19-7.27 (m, 3H), 7.10-7.17 (m, 3H), 6.84-6.90 (m, 2H), 5.27 (br d, J=9.20 Hz, 1H), 4.66 (s, 1H), 4.09 (qd, J=8.40, 4.58 Hz, 1H), 3.04 (dt, J=8.59, 4.60 Hz, 1H), 3.20 (br s, 2H), 2.81 (dd, J=14.03, 4.30 Hz, 1H), 2.54 (dd, J=14.03, 8.31 Hz, 1H), 2.18 (d, J=4.58 Hz, 2H), 1.43 (s, 3H) 1.38 (s, 3H); $^{13}$C NMR (126 MHz, CHLOROFORM-d) δ ppm 171.26, 146.92, 141.66, 141.65, 141.17, 141.13, 137.30, 129.37, 128.49, 128.37, 127.88, 127.81, 126.62, 126.48, 126.07, 125.68, 124.97, 120.39, 120.36, 70.56, 56.30, 55.77, 52.64, 44.23, 36.47, 29.78, 28.97.

Example 1.25 Synthesis of Compound 25

Synthesis of Intermediates—as in Example 1.10

2-(9H-fluoren-9-yl)-N-((2S,3R)-3-hydroxy-1-phenyl-4-((2-phenylpropan-2-yl)amino)-butan-2-yl) acetamide (25)

Reaction between (2R,3S)-3-amino-4-phenyl-1-((2-phenylpropan-2-yl)amino)butan-2-ol (10B) (150 mg, 0.5026 mmol) and 9H-fluorene-9-acetic acid (118 mg, 0.5026 mmol) in the presence of DMAP (31 mg, 0.2513 mmol), HOBt (88 mg, 0.6534 mmol) and EDC (125 mg, 0.6534 mmol) in 8 mL of dichloromethane was carried out as described in step 4. Purification: extraction (water/DCM), flash column chromatography (5% MeOH in DCM). Yield: 84.3 mg (33.23%), TLC (DCM/MeOH, 9/1 v/v) R$_f$=0.48, MW 504.67, Formula: $C_{34}H_{36}N_2O_2$, MS m/z 505.63 (M+H$^+$), $^1$H NMR (500 MHz, CHLOROFORM-d) δ ppm 7.72 (dd, J=7.45, 4.01 Hz, 2H), 7.39-7.46 (m, 3H), 7.29-7.38 (m, 4H), 7.16-7.29 (m, 7H), 7.06-7.11 (m, 2H), 6.01 (br d, J=8.60 Hz, 1H), 4.39 (t, J=6.87 Hz, 1H), 4.27 (ddd, J=8.59, 5.73, 2.29 Hz, 1H), 3.33 (q, J=4.60 Hz, 1H), 3.18 (br s, 2H), 2.88 (dd, J=14.32, 5.16 Hz, 1H), 2.67 (dd, J=14.03, 8.31 Hz, 1H), 2.56 (dd, J=14.89, 6.30 Hz, 1H), 2.45 (dd, J=14.89, 7.45 Hz, 1H), 2.37 (dd, J=12.60, 4.01 Hz, 1H), 2.30 (dd, J=12.03, 5.16 Hz, 1H), 1.44 (d, J=6.87 Hz, 6H); $^{13}$C NMR (126 MHz, CHLOROFORM-d) δ ppm 171.47, 146.92, 146.40, 140.76, 137.89, 129.33, 128.62, 128.42, 127.54, 127.52, 127.45, 127.31, 126.67, 126.57, 126.02, 124.56, 124.53, 120.04, 120.02, 55.80, 53.59, 53.48, 44.43, 43.75, 40.66, 36.70, 29.70, 29.10.

Example 1.26 Synthesis of Compound 26

Synthesis of Intermediates—as in Example 1.13

N-((2S,3R)-3-hydroxy-4-(neopentylamino)-1-phenylbutan-2-yl)-9H-fluorene-9-carboxamide (26)

Reaction between (2R,3S)-3-amino-1-(neopentylamino)-4-phenylbutan-2-ol (13B) (150 mg, 0.5991 mmol) and 9H-fluorene-9-carboxylic acid (138 mg, 0.5991 mmol)) in the presence of DMAP (37 mg, 0.2996 mmol), HOBt (105 mg, 0.7788 mmol) and EDC (149 mg, 0.7788 mmol) in 8 mL of dichloromethane was carried out as described in step 4. Purification: extraction (water/DCM), flash column chromatography (0-10% MeOH in DCM). Yield: 51.3 mg (19.33%), TLC (DCM/MeOH, 9/1 v/v) R$_f$=0.34, MW 442.60, Formula: $C_{29}H_{34}N_2O_2$, MS m/z 443.22 (M+H$^+$), $^1$H NMR (500 MHz, CHLOROFORM-d) δ ppm 7.73-7.77 (m, 2H), 7.47 (t, J=7.73 Hz, 1H), 7.40-7.45 (m, 2H), 7.34 (td, J=7.45, 1.15 Hz, 1H), 7.25-7.30 (m, 1H), 7.15-7.23 (m, 4H), 6.97 (dd, J=7.45, 2.29 Hz, 2H), 5.67 (d, J=8.59 Hz, 1H), 4.66 (s, 1H), 4.33-4.41 (m, 1H), 3.37-3.42 (m, 1H), 3.13 (dd, J=14.32, 4.01 Hz, 1H), 3.04 (dd, J=12.60, 1.72 Hz, 1H), 2.85 (d, J=12.03 Hz, 1H), 2.75 (dd, J=14.32, 8.59 Hz, 1H), 2.61 (dd, J=12.89, 4.87 Hz, 1H), 2.54 (d, J=12.03 Hz, 1H), 1.23 (s, 9H), NH, OH were not registered; $^{13}$C NMR (126 MHz, CHLOROFORM-d) δ ppm 172.86, 141.80, 141.26, 140.43, 136.51, 129.43, 128.75, 128.60, 128.05, 127.81, 126.80, 125.71, 124.60, 120.55, 69.58, 61.30, 55.51, 53.29, 52.34, 36.08, 31.24, 27.75.

Example 1.27 Synthesis of Compound 27

Synthesis of Intermediates—as in Example 1.13

2-(9H-fluoren-9-yl)-N-((2S,3R)-3-hydroxy-4-(neopentylamino)-1-phenylbutan-2-yl)acetamide (27)

Reaction between (2R,3S)-3-amino-1-(neopentylamino)-4-phenylbutan-2-ol (13B) (150 mg, 0.5991 mmol) and 9H-fluorene-9-acetic acid (134 mg, 0.5991 mmol)) in the presence of DMAP (37 mg, 0.2996 mmol), HOBt (105 mg, 0.7788 mmol) and EDC (149 mg, 0.7788 mmol) in 8 mL of dichloromethane was carried out as described in step 4. Purification: extraction (water/DCM), chromatography column flash (5% MeOH in DCM). Yield: 124.3 mg (45.43%), TLC (DCM/MeOH, 9/1 v/v) $R_f$=0.35, MW 456.63, Formula: $C_{30}H_{36}N_2O_2$, MS m/z 457.44 (M+H$^+$), $^1$H NMR (500 MHz, CHLOROFORM-d) δ ppm 7.72 (dd, J=7.45, 5.16 Hz, 2H), 7.50 (dd, J=7.45, 1.15 Hz, 1H), 7.18-7.41 (m, 8H), 7.09-7.14 (m, 2H), 5.52 (d, J=8.59 Hz, 1H), 4.31 (t, J=5.73 Hz, 1H), 4.10-4.19 (m, 1H), 3.10 (br s, 1H), 3.02 (dd, J=14.32, 4.58 Hz, 1H), 2.81 (t, J=5.16 Hz, 2H), 2.61-2.72 (m, 2H), 2.42 (d, J=11.46 Hz, 1H), 2.04-2.09 (m, 1H), 1.98 (br s, 1H), 0.98 (s, 9H), NH, OH were not registered; $^{13}$C NMR (126 MHz, CHLOROFORM-d) δ ppm 171.76, 145.94, 145.76, 140.92, 140.76, 137.25, 129.46, 128.71, 127.78, 127.62, 127.37, 126.74, 124.74, 124.25, 120.08, 70.02, 61.50, 53.54, 52.54, 43.96, 39.68, 36.33, 31.25, 27.66.

Example 1.28 Synthesis of Compound 28

Synthesis of Intermediates—as in Example 1.16

N-((2S,3R)-4-((cyclopropylmethyl)amino)-3-hydroxy-1-phenylbutan-2-yl)-2-(9H-fluoren-9-yl)acetamide (28)

Reaction between (2R,3S)-3-amino-1-((cyclopropylmethyl)amino)-4-phenylbutan-2-ol (16B) (150 mg, 0.6401 mmol) and 9H-fluorene-9-acetic acid (144 mg, 0.6401 mmol) in the presence of DMAP (39 mg, 0.3201 mmol), HOBt (112 mg, 0.8321 mmol) and EDC (160 mg, 0.8321 mmol) in 8 mL of dichloromethane was carried out as described in step 4. Purification: extraction (water/DCM), flash column chromatography (5% MeOH in DCM). Yield: 103.7 mg (36.76%), TLC (DCM/MeOH, 9/1 v/v) $R_f$=0.27, MW 440.59, Formula: $C_{29}H_{32}N_2O_2$, MS m/z 441.36 (M+H$^+$), $^1$H NMR (500 MHz, CHLOROFORM-d) δ ppm 7.76 (d, J=7.45 Hz, 2H), 7.56 (dd, J=14.32, 8.02 Hz, 2H), 7.37 (t, J=7.40 Hz, 2H), 6.98-7.33 (m, 8H), 4.62-4.73 (m, 1H), 3.99 (dd, J=13.17, 8.02 Hz, 1H), 3.80-3.90 (m, 1H), 3.55-3.69 (m, 1H), 2.98-3.18 (m, 4H), 2.81 (d, J=7.45 Hz, 2H), 2.34-2.65 (m, 1H), 2.04 (br s, 2H), 0.53-0.78 (m, 1H), 0.30-0.45 (m, 2H), 0.01-0.14 (m, 2H); $^{13}$C NMR (126 MHz, CHLOROFORM-d) δ ppm 174.29, 146.96, 140.85, 129.52, 128.73, 127.50, 127.37, 127.28, 126.57, 124.76, 124.72, 120.03, 56.15, 54.06, 51.10, 44.35, 44.05, 39.43, 37.97, 10.39, 3.88, 3.74.

EXAMPLE 2. IN VITRO ACTIVITY OF COMPOUNDS

Example 2.1. Test of the Ability to Inhibit Enzymes: Horse Plasma Butyrylcholinesterase (eqBuChE) and Human Plasma Butyrylcholinesterase (hBuChE)

The spectrophotometric Ellman's test [Ellman et al.] modified for assays in 96-well plates was used to test the activity. Reagents: 5,5'-dithiobis-(2-nitrobenzoic acid) (DTNB), eqBuChE and butyrylthiocholine iodide (BTC) were purchased from Sigma-Aldrich (Steinheim, Germany). hBuChE was from Vivonics (Bedford, MA, USA). The enzymes were prepared by dissolving in demineralized water to a concentration of 0.384 U/ml. Stock solutions of test compounds were prepared by dissolving in DMSO to a concentration of 0.0034 M. They were then diluted with water to obtain the appropriate concentrations in the wells. In the first step of the test, 25 μl of test compound (or DMSO/water mixture at the appropriate ratio for blank samples) was incubated in 0.1 M phosphate buffer (200 μl, pH=8.0) with DTNB (20 μl; 0.0025M) and with the appropriate enzyme (20 μl; eqBuChE or hBuChE) at 25° C. (animal enzyme) or 36° C. (human enzyme). After a 5 minutes incubation period, 20 μl of BTC solution (0.00375 M) was added. After another 5 minutes, the changes in absorbance of the solutions were measured at 412 nm using a multifunctional microplate reader (EnSpire Multimode; PerkinElmer; Waltham, MA, USA). All compounds were tested at a screening concentration of 10 μM (eqBuChE) or 1 μM (hBuChE). The percentage of enzyme inhibition was calculated from the equation 100-(S/B)×100, where S and B were the enzymatic activity in the test sample well and in the well without sample, respectively. For compounds with an enzyme inhibitory ability at a screening concentration greater than 50% (eqBuChE) or 80% (hBuChE), $IC_{50}$ values were determined. To determine the $IC_{50}$ value, seven different concentrations of each compound were used to obtain an enzyme activity from 5% to 95%. All reactions were performed in triplicate. $IC_{50}$ values were calculated using non-linear regression (GraphPad Prism 5 [GraphPad Software, San Diego, CA, USA 5.00]) for the percentage of enzyme inhibition against the inhibitor concentration used. Tacrine and donepezil were used as reference compounds.

Example 2.2. Testing the Ability of the Inhibition of Human Recombinant Beta-Secretase (hBACE1)

The FRET assay [Vassar, et al.] was used to test activity using 384-well black plates and a microplate reader (EnSpire Multimode; PerkinElmer; Waltham, MA, USA). The test was purchased from Life Technologies Polska Sp. z o.o. (Warsaw, Poland). The analytical wavelength was optimized and found to be 553 nm for excitation and 576 nm for emission. Stock solutions of test compounds were prepared in DMSO and then further diluted with assay buffer (50 mM sodium acetate; pH 4.5) to the appropriate concentrations in the wells. In the first step of the test, 10 μl of the substrate (Rh-EVNLDAEFK quencher, based on the so-called Swedish APP mutation) was mixed with 10 μl of the test compound (or assay buffer; for blank sample). The enzyme reaction was initiated by adding 10 μl of enzyme (hBACE1, 1 U/ml). The reaction mixture was incubated at 25° C. for 60 minutes, then 10 μL of Stop solution (2.5 M sodium acetate) was added. After stopping the reaction, fluorescence was measured at 576 nm. The percentage of enzyme inhibition was calculated from the formula [1−(S60−S0)/(C60−C0)]× 100, where S0 and S60 are the fluorescence of the test sample (containing the enzyme, substrate and test compound) at the start of the reaction and after 60 minutes, respectively, whereas C0 and C60 were analogous fluorescence intensities in the blank samples (containing enzyme, substrate and buffer). All test compounds were tested at a concentration of 50 μM in triplicate. $IC_{50}$ values were determined for test compounds with at least 80% enzyme inhibitory activity at the 50 μM screening concentration. A BACE1 IV inhibitor (Calbiochem, Merck; Nottingham, UK) [Stachel et al.] was used as a reference compound. The $IC_{50}$ value of the inhibitor IV was determined using eight different concentrations of the compound resulting in enzyme inhibition between 10% and 95%. $IC_{50}$ values for all test compounds were calculated using non-linear regression (GraphPad Prism 5 [GraphPad Software, San Diego, CA, USA 5.00]) for the percentage of enzyme inhibition against the inhibitor concentration used.

Example 2.3. Testing the Antiaggregation Activity Against Beta-Amyloid (Aβ)

The thioflavin T test [Levine III] was used for the determinations. Recombinant human $A\beta_{1-42}$ peptide (HFIP pretreated, Merck Millipore, Darmstadt, Germany) was dissolved in DMSO to form a 75 μM stock solution. The solution was further diluted in HEPES buffer (150 mM HEPES, pH 7.4, 150 mM NaCl) to a concentration of 7.5 μM. Then, the $A\beta_{1-42}$ solution was added to the test compounds (black 96-well plates were used) and diluted with thioflavin T solution (10 μM final concentration). The final mixture contained 1.5 μM $A\beta_{1-42}$, 10 μM test compound, and 3% of DMSO. Fluorescence was measured every 300 s (excitation wavelength was 440 nm, emission wavelength was 490 nm) with continuous mixing between measurements. A multifunction microplate reader (Synergy H4; BioTek Instruments, Inc., Winooski, VT, USA) was used to measure the fluorescence. Fluorescence started increasing after approximately 4 hours, plateaued after 20 hours and remained virtually unchanged for the next 28 hours of incubation. The plateau-phase fluorescence intensities (in the presence and absence of test compounds) were averaged and the mean fluorescence values for the respective wells at t=0 h were subtracted from them. The percent inhibition of $A\beta_{1-42}$ aggregation was calculated from the formula % inh=$(1-F_i/F_0)\times 100\%$, where $F_i$ is the increase in fluorescence of $A\beta_{1-42}$ in the sample with the test compound, and $F_0$ is the increase in fluorescence of $A\beta_{1-42}$ alone (without the test compound). Dilutions of test compounds in the wells over the 30 nM to 30 μM concentration range were used to determine $IC_{50}$ values. $IC_{50}$ values were calculated using non-linear regression (GraphPad Prism 5 [GraphPad Software, San Diego, CA, USA 5.00]) for the percentage of aggregation inhibition against the inhibitor concentration used.

Results of in vitro activity obtained for exemplary compounds according to the invention are collected in Table 2.

TABLE 2

Results of in vitro biological tests

| Name | Structure | eqBuChE[a] $IC_{50}$ [μM] | hBuChE[b] $IC_{50}$ [μM]/% inh | hBACE-1[c] $IC_{50}$ [μM]/ % inh | inh. Aβ aggr.[d] % inh |
|---|---|---|---|---|---|
| (1) | | 0.627 | 0.196 | 10.11 | 82.5% |
| (2) | | 0.333 | 0.571 | 4.82 | 86.3% |
| (3) | | 78.25% | 68.0% | 6.35 | 90.9% |

TABLE 2-continued

Results of in vitro biological tests

| Name | Structure | eqBuChE[a] IC$_{50}$ [μM] | hBuChE[b] IC$_{50}$ [μM]/% inh | hBACE-1[c] IC$_{50}$ [μM]/% inh | inh. Aβ aggr.[d] % inh |
|---|---|---|---|---|---|
| (4) | | 0.514 | 0.489 | 3.92 | 83.7% |
| (5) | | 0.803 | 61.98% | 6.64 | 75.6% |
| (6) | | 2.196 | 67.72% | 2.25 | 93.3% |
| (7) | | 0.278 | 0.268 | 7.23 | 86.7% |
| (8) | | 0.751 | 0.721 | 3.19 | 72.4% |
| (9) | | 0.264 | 0.812 | 20.12 | 63% |

TABLE 2-continued

Results of in vitro biological tests

| Name | Structure | eqBuChE[a] IC$_{50}$ [μM] | hBuChE[b] IC$_{50}$ [μM]/% inh | hBACE-1[c] IC$_{50}$ [μM]/% inh | inh. Aβ aggr.[d] % inh |
|---|---|---|---|---|---|
| (10) | | 0.345 | 1.167 | 17.18 | 90.8% |
| (11) | | 0.955 | 76.48% | 8.60 | 78.6% |
| (12) | | 4.842 | 58.81% | 48.66% | 67.2% |
| (13) | | 1.18 | 61.27% | 8.59 | 80.2% |
| (14) | | 1.078 | 67.87% | 36.83% | 82.5% |
| (15) | | 0.975 | 1.033 | nd | nd |

TABLE 2-continued

Results of in vitro biological tests

| Name | Structure | eqBuChE[a] IC$_{50}$ [μM] | hBuChE[b] IC$_{50}$ [μM]/% inh | hBACE-1[c] IC$_{50}$ [μM]/ % inh | inh. Aβ aggr.[d] % inh |
|---|---|---|---|---|---|
| JT-3 (16) | | 0.313 | 0.207 | 61.34% | 79.0% |
| (17) | | 1.756 | 66.39% | 11.5 | 42.5% |
| (18) | | 1.220 | 55.61% | 1.12 | 63.5% |
| (19) | | 3.022 | 77.14% | 78.33% | 86.7% |
| (20) | | 2.203 | 74.46% | 71.1% | <10% |
| (21) | | 2.019 | 54.33% | 2.12 | <10% |

TABLE 2-continued

Results of in vitro biological tests

| Name | Structure | eqBuChE[a] IC$_{50}$ [μM] | hBuChE[b] IC$_{50}$ [μM]/% inh | hBACE-1[c] IC$_{50}$ [μM]/ % inh | inh. Aβ aggr.[d] % inh |
|---|---|---|---|---|---|
| (22) | | 42% | <10% | 72.58% | <10% |
| (23) | | 8.86 | 0.558 | 7.36 | 59.4% |
| (24) | | 2.84 | 21.37% | 5.15 | 61% |
| (25) | | 1.27 | 71.70% | 4.96 | 63% |
| (26) | | 1.088 | 61.07% | 54.53% | 39.5% |

TABLE 2-continued

Results of in vitro biological tests

| Name | Structure | eqBuChE[a] IC$_{50}$ [μM] | hBuChE[b] IC$_{50}$ [μM]/% inh | hBACE-1[c] IC$_{50}$ [μM]/ % inh | inh. Aβ aggr.[d] % inh |
|---|---|---|---|---|---|
| (27) | | 0.383 | 0.207 | 52.4% | 53.5% |
| (28) | | 1.188 | 0.246 | 12.3 | 73.4% |

[a]IC$_{50}$ values for animal (electric eel) butyrylcholinesterase inhibition or percent inhibition of enzyme at 10 μM inhibitor concentration, [b]IC$_{50}$ values for human butyrylcholinesterase inhibition or percent inhibition of enzyme at 1 μM inhibitor concentration, [c]IC$_{50}$ values for animal P-secretase inhibition or percent inhibition of enzyme at 50 μM inhibitor concentration, [d]percent inhibition of β-amyloid aggregation at 10 μM, nd - not determined.

Example 2.4. Inhibition of Particular Subtypes of γ-Aminobutyric Acid Transporters (GAT) Test The compounds according to the invention have a non-selective inhibitory profile for γ-aminobutyric acid transporters. The most important transporter for Alzheimer's disease is the GAT4 isoform, which is found on astrocytes and microglia cells. The validity of GAT4 inhibition in the treatment of Alzheimer's disease has been proven in animal studies (Z. Wu, Z. Guo, M. Gearing, G. Chen, Tonic inhibition in dentate gyrus impairs long-term potentiation and memory in an Alzheimer's disease model, Nat. Commun. 5 (2014) 1-13).

Exemplary compounds according to the invention were screened at the Ludwig-Maximilian University of Munich to determine the inhibitory ability towards four mouse GAT transporters (mGAT1-mGAT4). The radioligand used in the research was tritium labeled [3H]GABA, which shows high affinity for particular isoforms of mouse transporters. The biological material was stably transfected human embryonic kidney HEK293 cells, expressing genes to the appropriate transporters. The generated radioactivity was measured with a liquid scintillation counter. The screening tests were performed at a concentration of 100 μM, and the pIC$_{50}$ value was determined for compounds showing at least 50% inhibitory potential from three independent experiments. These determinations were made according to the procedure described in detail in A. Kragler, G. Höfner, K. T. Wanner, Novel parent structures for inhibitors of the murine GABA transporters mGAT3 and mGAT4, Eur. J. Pharmacol. 519 (2005) 43-47. The obtained results are presented in Table 3.

TABLE 3

Inhibition values determined for each subtype of γ-aminobutyric acid transporters (GAT

| Name | Structure | pIC$_{50}$ (+/-SEM) | | | |
|---|---|---|---|---|---|
| | | mGAT1 | mGAT2 | mGAT3 | mGAT4 |
| (1) | 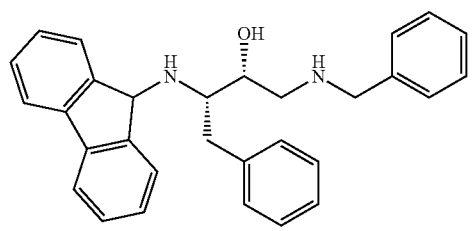 [SMILES: O[C@H](CNCc1ccccc1)[C@H](Cc1ccccc1)NC1c2ccccc2-c2ccccc21] | 4.96 | 5.01 +/- 0.08 | 5.15+/- 0.07 | 5.11 +/- 0.01 |

TABLE 3-continued

Inhibition values determined for each subtype of γ-aminobutyric acid transporters (GAT

| Name | Structure | pIC$_{50}$ (+/−SEM) | | | |
| --- | --- | --- | --- | --- | --- |
| | | mGAT1 | mGAT2 | mGAT3 | mGAT4 |
| (3) | | 4.83 | 4.58 | 5.05 +/− 0.05 | 56% |
| (6) | | 5.15 | 4.92 +/− 0.14 | 66% | 5.15 +/− 0.034 |
| (7) | | 5.20 | 4.88 +/− 0.07 | 65% | 5.21 +/− 0.04 |
| (11) | | 54% | 4.97 | 4.94 | 59% |
| (16) | | 4.96 | 51% | 5.13 +/− 0.04 | 5.11 +/− 0.02 |
| (17) | | 4.85 | 4.80 | 4.93 | 5.14 +/− 0.004 |

TABLE 3-continued

Inhibition values determined for each subtype of γ-aminobutyric acid transporters (GAT

| Name | Structure | pIC$_{50}$ (+/−SEM) | | | |
|---|---|---|---|---|---|
| | | mGAT1 | mGAT2 | mGAT3 | mGAT4 |
| (19) | | 4.90 | 114% | 4.90 | 4.81 |
| (20) | | 5.02 | 5.04 | 5.08 | 5.39 |
| (22) | | 83% | 97% | 90% | 69% |
| (23) | | 4.73 | 4.84 | 59% | 61% |
| (27) | | 4.32 | 52% | 4.52 | 4.86 |

TABLE 3-continued

Inhibition values determined for each subtype of γ-aminobutyric acid transporters (GAT

| Name | Structure | pIC$_{50}$ (+/−SEM) | | | |
|---|---|---|---|---|---|
| | | mGAT1 | mGAT2 | mGAT3 | mGAT4 |
| (28) | 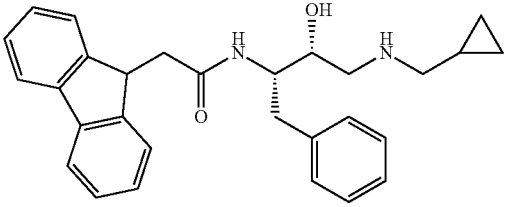 [SMILES: O=C(CC1c2ccccc2-c2ccccc21)N[C@@H](Cc1ccccc1)[C@H](O)CNCC1CC1] | 4.87 | 10% | 5.09 | 4.90 | pIC$_{50}$ values for GABA reuptake (value +/− SEM, number of experiments n ≥ 3, for pIC$_{50}$ values higher than 5; for values between 4-5, number of experiments n = 1); the percentages represent the percentage of [3H]GABA reuptake retained in the presence of an inhibitor at a concentration of 100 μM.

EXAMPLE 3. ACUTE TOXICITY AND PHARMACOKINETIC STUDIES

Laboratory Animals

The research was carried out at the Department of Toxicology and Military Pharmacy, Faculty of Military Health Sciences in Hradec Kralove, Defense University in Brno in the Czech Republic, at the Biomedical Research Center and at the Department of Clinical Biochemistry of the University Hospital Hradec Kralove in the Czech Republic. All procedures were carried out under the supervision of the Ethics Committee of the Faculty of Military Health Sciences (No. 20/19; MO 215611/2019-684800). Male and female ICR-CD1 strain of domestic mice (*Mus musculus*) (body weight approx. 20-25 g) were used in the research. The animals were kept in standard, appropriately sized cages, divided into groups of a maximum of 8 animals. The animals in the test groups were administered the test compound intraperitoneally (doses in the acute toxicity study: 10, 20, 40 and 60 mg/kg, dose in the study of pharmacokinetic parameters 10 mg/kg). Control groups received 1% Tween 80.

Equipment Used for Research

U-320R centrifuge (Boeco, Hamburg, Germany), BX-51 microscope (Olympus, Tokyo, Japan), liquid chromatography system consisting of the Ultimate 3000 RS Dionex pump (Thermo Scientific, San Jose, California, USA) in combination with a high resolution mass spectrometer with an orbitrap analyzer (Q Exactive Focus, Thermo Scientific, San Jose, California, USA).

Analysis of the Results

In the acute toxicity study, IBM SPSS Statistics (version 24, USA) was used for statistical calculations. One-way analysis of variance (ANOVA) was used to compare the mean values for the groups (n=4). Student's t-test was used for post hoc analysis. The difference in means was considered statistically significant at the significance level (h≤0.05). GraphPadPrism (version 6.05, USA) was used for statistical calculations in the pharmacokinetic parameters study. Results are presented as the mean±standard error of the mean (SEM, n=6). Standard non-compartmental analysis was performed using Kinetica software (version 4.0, USA).

Example 3.1. Acute Toxicity Study of Compound JT3 (16)

Test Procedure

The study assesses the toxicity profile of the compound by observation of emerging adverse effects, biochemical parameters analysis and histopathological analysis, and determines the maximum tolerated dose (MTD). Mice were randomly assigned to experimental groups consisting of two males and two females. After administration of the test compound, animals were observed for signs of toxicity. Toxic symptoms were classified as in the previous published study [J. Misik]. Weight loss or reduction in food consumption was assessed according to the FELAS classification [K. L. Chapman] for the first two hours, and then periodically for the next 46 hours. All 48-hour survivors were euthanized. Blood was collected for biochemical analysis and selected organs (kidneys and liver) were collected for histopathological examination. Venous blood was collected in heparinized tubes. Plasma was then separated (3000×g, 5 min, 4° C.) using a centrifuge. The concentration of urea and creatinine as well as the activity of alanine aminotransferase (ALT), aspartate aminotransferase (AST), alkaline phosphatase (ALP), amylase and lactate dehydrogenase (LDH) were determined in an accredited biochemical laboratory. The harvested organs: liver and kidneys were used for standard histopathological examination. Organs were fixed with 10% neutral buffered formalin, processed for histology, and stained with hematoxylin and eosin as in a previous published study [J. Pejchal]. Histopathological changes were assessed microscopically.

The Research Results

Determination of the Maximum Tolerated Dose of JT-3

Based on the observed side effects, biochemical changes and the results of histopathological analysis, the maximum tolerated dose (MTD) of 10 mg/kg was determined in mice administered JT-3 in four doses (10, 20, 40 and 60 mg/kg).

The Effect of Compound JT-3 on the Appearance of Side Effects at the Dose of 10 mg/kg At the dose indicated as MTD (10 mg/kg), mild side effects were seen in some animals and moderate tremors were seen in one of the animals. The observed adverse reactions are presented in Table 4.

TABLE 4

Signs of intoxication observed in male and female mice after administration of JT-3 at 10 mg/kg (MTD).

| Toxic effect | Mice | | | |
|---|---|---|---|---|
| | Male1 | Male2 | Female1 | Female2 |
| Hyper/Hypoventilation | + | + | + | + |
| Drooping eyelids | | | + | + |
| General exhaustion | + | + | + | + |
| Tremor | + | + | + | ++ |
| Convulsions | | | | + |
| Body weight change at 24 h (%) | −1.3 | −1.2 | −3.9 | −5.8 |
| Body weight change at 48 h (%) | −2.4 | −0.7 | −0.4 | −5.2 |

The symptoms of intoxication were rated as mild (+), moderate (++) and severe (+++).

Effect of Compound JT-3 on Biochemical Parameters at the Dose of 10 mg/kg

The levels of urea, creatinine, liver enzymes, alkaline phosphatase (ALP), amylase and lactate dehydrogenase (LDH) were determined. At the dose determined as MTD (10 mg/kg), no statistically significant changes were observed compared to the control sample.

TABLE 5

Biochemical parameters following administration of compound JT-3 at a dose of 10 mg/kg (MTD).

| Parameters | Control sample | JT-3 (10 mg/kg) |
|---|---|---|
| Urea (mg/dL) | 36.2 ± 8.4 | 33.8 ± 8.2 |
| Creatinine (µg/dL) | n.d. | n.d. |
| ALT (U/L) | 31.7 ± 9.6 | 29.0 ± 6.5 |
| AST (U/L) | 56.9 ± 7.4 | 56.8 ± 6.6 |
| ALP (U/L) | 67.5 ± 21.9 | 68.4 ± 27.2 |
| Amylase (U/L) | 3158 ± 497 | 2955 ± 501 |
| LDH (U/L) | 249 ± 47 | 275 ± 94 | n.d. value below the limit of detection

Effect of Compound JT-3 on the Appearance of Histopathological Changes at the Dose of 10 mg/kg At the dose of JT-3 designated as the MTD (10 mg/kg), only sporadic infiltration of neutrophils into the liver and adipose tissue was observed in two animals, without any signs of liver or kidney damage, and mild irritation of the peritoneum at the injection site, while in the other two, no such changes have been observed.

Example 3.2. Study of the Pharmacokinetic Parameters of the Compound JT3 (16)

Test Procedure

After administration of compound JT-3 at the MTD dose (10 mg/kg), animals were subjected to deep terminal sedation at 0, 3, 5, 10, 20, 30, 45, 60, 90, 120, 240 and 360 minutes after dosing (six animals per time interval; n=6) and their blood was drawn by cardiac puncture into heparinized tubes. Samples were centrifuged (3000×g, 10 minutes, 10° C.). Plasma was stored at −80° C. until analyzed by HPLC. Blood in the cerebral vessels would interfere with the actual concentration levels in the brain tissue, therefore the animals were perfused transcardially with physiological saline (0.9% NaCl) for 5 minutes (10 mL/min). After perfusion, the skull was opened and the brain was carefully removed and stored at −80° C. until analyzed by HPLC.

HPLC Analysis

Quantitative analyzes of JT-3 in plasma and brain were performed by HPLC. The method has been fully validated for plasma and partially validated for brain homogenate according to the EMA and FDA guidelines for the validation of bioanalytical methods [Research, C, Anonymous].

The Research Results

Changes in JT-3 Concentrations in Plasma and Brain

Very good penetration of JT-3 into the brain has been established. After intraperitoneal administration, it reaches higher concentrations in the CNS than in plasma in a relatively short time. The maximum concentration of the compound was determined 60 minutes after administration, which fully coincides with the time of testing the activity of the compound in the previously performed memory tests.

FIG. 1 shows the changes in JT-3 concentrations in plasma and brain after a single administration of the compound at the MTD dose (10 mg/kg).

Pharmacokinetic Parameters for JT-3

Basic pharmacokinetic parameters were determined for JT-3 and are collected in Table 6.

TABLE 6

Determined pharmacokinetic parameters for JT-3 in plasma and brain

| | Values |
|---|---|
| PLASMA | |
| $C_{max}$ (ng/mL) | 430.09 ± 57.94 |
| $T_{max}$ (min) | 23.33 ± 4.97 |
| $AUC_{total}$ (min · ng/mL) | 58 804.62 ± 3 318.21 |
| $\lambda_z$ (1/min) | 0.0045 ± 0.0004 |
| Half-life (min) | 161.44 ± 14.25 |
| MRT (min) | 217.10 ± 17.65 |
| CL (L/min/kg) | 0.17 ± 0.01 |
| Vz (L/kg) | 40.93 ± 4.95 |
| Vss (L/kg) | 38.17 ± 4.47 |
| BRAIN | |
| $C_{max}$ (ng/g) | 833.00 ± 62.32 |
| $T_{max}$ (min) | 55.00 ± 6.80 |
| $AUC_{total}$ (min · ng/g) | 650 923.00 ± 152 288.00 |

$C_{max}$ = maximum plasma concentration of JT-3; $T_{max}$ = $C_{max}$ time; $AUC_{total}$ = area under the concentration-time curve from zero to infinity; $\lambda_z$ = terminal phase rate constant; half-life refers to the elimination phase; MRT = mean residence time of the molecule in the body; CL = clearance; Vz = volume of distribution during terminal phase; Vss = apparent volume of distribution at steady state.

EXAMPLE 4. BEHAVIORAL STUDIES OF COMPOUND JT3 (16)

Laboratory Animals

The research was conducted at the Department of Pharmacodynamics, Faculty of Pharmacy, Jagiellonian University in Krakow. All procedures were approved by the 1st and 2nd Local Ethics Committee for Animal Experiments in Krakow (consent no. 53/2017 and 250/2019) and were performed in accordance with the applicable European Union regulation (86/609/EEC). Males of two different strains of domestic mice (Mus musculus) were used in the study: Albino Swiss CD-1 (body weight approx. 20-24 g, age approx. 6 weeks) and C57BL/6J mice (body weight approx. 18-22 g, age approx. 6 weeks). The CD-1 strain was used for the passive avoidance, spontaneous mobility and rotating rod tests, while the C57BL/6J mice were used for the Morris water maze and the Barnes' maze. The animals were kept in standard, appropriately sized cages, divided into groups with a maximum of 10 animals. The animals in the study groups in the learning phase were intraperitoneally administered the test compound 1 h before the start of the experiments (doses in the preliminary test, i.e. in the passive avoidance test: 10, 30 and 60 mg/kg), and 30 minutes later, 1 mg/kg of scopolamine subcutaneously. Two control groups were used in the tests to assess the procognitive activity of JT-3—one of them received saline and the other saline and scopolamine.

The Equipment Used for Testing

Passive avoidance test apparatus (LE 800 Passive Avoidance Apparatus, Harvard Apparatus, Spain); the Morris water maze (Panlab Harvard Apparatus, Spain); Barnes's Labyrinth (Panlab Harvard Apparatus, Spain); actometers (Activity Cage 7441, Ugo Basile, Italy); a rotating rod (RotaRod apparatus RR 0711, May Commat, Turkey).

Analysis of the Results

GraphPadPrism (version 8.0, USA) was used for statistical calculations. Results are presented as the mean of the measurements±standard error of the mean (SEM). When comparing mean values for groups, one-way analysis of variance (ANOVA), analysis of variance with repeated measures or Student's t-test for independent samples, selected depending on the conducted behavioral experiment, were used. Dunnett's test was used for post hoc analysis. The difference of means was considered statistically significant at the significance level $p<0.05$.

Example 4.1. Passive Avoidance Task

Test Procedure

The test assesses contextual memory. The apparatus consists of two chambers (white: 26 cm×26 cm×34 cm; dark: 13 cm×7.5 cm×7.5 cm) separated by a door. The test consists of a two-day procedure. On the first day (acquisition phase), test compound or saline was administered to the animals 1 h prior to testing (i.p. administration). In order to induce memory disorders, scopolamine (1 mg/kg, s.c.) was also administered after 30 min. On the first day of testing, the mouse was placed in the white compartment. After a 30 s period of habituation and exploration of this chamber, the door between the two compartments opened automatically. If the mouse entered the dark compartment, the door closed and the mouse was subjected to an electric shock (stimulus intensity: 0.2 mA; stimulus duration: 2 s). The latency of entry into the dark chamber was measured. 24 h later (recall phase) the same activities were repeated except for the administration of compound/saline/scopolamine and exposure of the mice to electric shock. The animals were placed in the white chamber for a period of 180 s. After 30 s the door between the compartments was opened and, similarly to the acquisition phase, the latency time of entering the dark compartment was measured. The increase in latency on the second study day (recall phase) compared to day one is associated with the potential procognitive effect of JT-3.

Test Results

Figure 2:
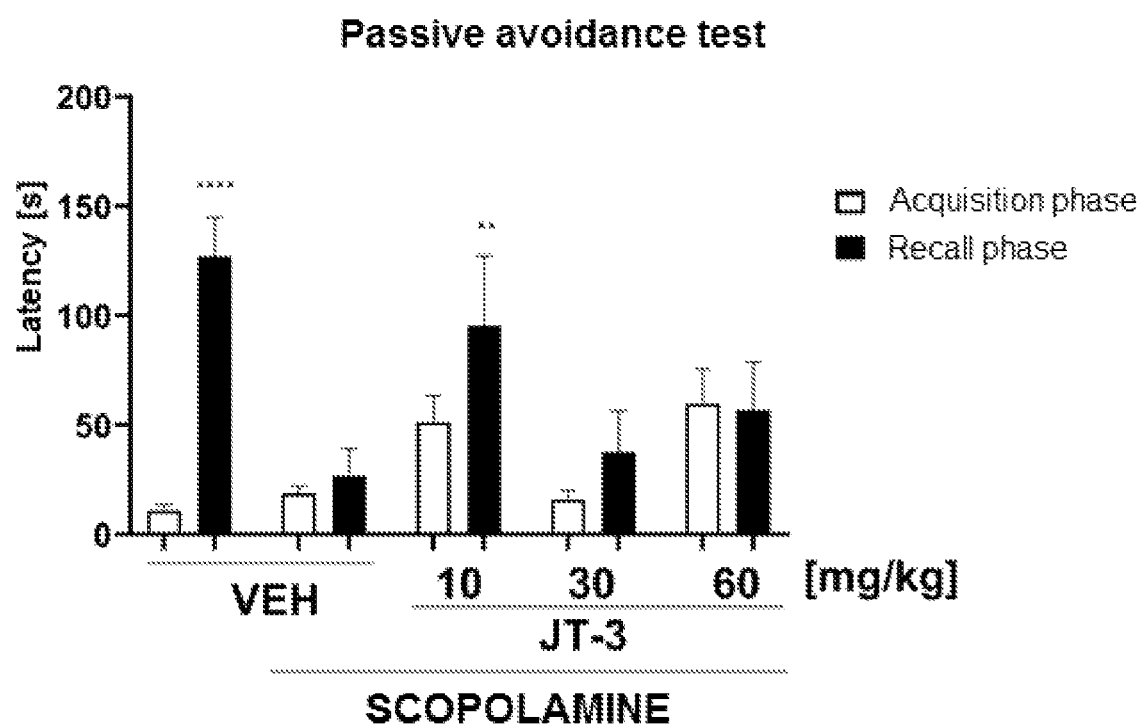

In the passive avoidance test on day 2 of the test, i.e. in the recall attempt, a statistically significant difference was demonstrated between the control group, which received scopolamine, and the group that received scopolamine and JT-3 at a dose of 10 mg/kg ($p<0.01$). Higher doses of JT-3 (30 mg/kg and 60 mg/kg) were not active (FIG. 2). Due to the statistically significant results obtained for JT-3 at the dose of 10 mg/kg, the dose of 10 mg/kg was selected for extended studies, i.e. the Morris water maze and the Barnes maze.

FIG. 2 presents the effect of the tested compound JT-3 on memory processes in mice in the passive avoidance test. The results are presented as the mean latency [s]±SEM of entry into the black compartment. Statistical analysis: analysis of variance with repeated measures and Dunnett's post hoc test. Statistical significance in relation to the control group, which received scopolamine:  $p<0.01$, ** $p<0.0001$.

Example 4.2. Morris Water Maze Test

Test Procedure

The experiment investigates the hippocampal-dependent spatial memory of mice. The apparatus consists of a pool (diameter of 120 cm, height of 60 cm) filled with water (up to a height of approx. 45 cm) at a temperature of approx. 25° C. The pool is divided into four quarters (NE, NW, SE, SW). In the selected zone (NW) there is a platform made of plexiglass hidden under water (approx. 0.5 cm below the water level), invisible to animals (diameter of 12 cm). On the walls of the room, geometric shapes in certain colors were placed, which served as landmarks for the animals. The platform remains in the same place for 6 consecutive days of the acquisition phase (learning phase). Above the pool there is a camera connected to a computer and software (Smart v. 3.0, Panlab Harvard Apparatus, Spain), which enables automatic recording of animal movements and analysis of all parameters presented below.

At this stage of the study, each mouse underwent four trials every day (trial interval approx. 1 hour). Each time the mouse was gently placed in a different location (a different quarter of the pool). For the next 60 seconds, the mouse searched the pool for a platform. If the animal had not found the platform after 60 seconds, it was directed to it by the experimenter and left there for 15 seconds. The mouse was then removed from the pool, gently dried and transferred to home cages. During the acquisition (learning) phase, the time and distance traveled to find the platform were measured. Additionally, the trajectories of movement in the pool were analyzed. On the seventh day, the actual test to assess spatial memory was carried out. Test compounds and scopolamine were not administered during this phase. The platform was removed from the pool, the mouse was placed in the pool in a randomly selected quadrant and remained there for a period of 60 s. The latency of finding the place where the platform was previously (during the acquisition/learning phase) was measured, as well as the number of crossings through the zone, where the platform was in the acquisition phase. In addition, the total residence time and distance traveled in the relevant quadrant of the pool (in the NW zone where the platform was at the time of acquisition) were measured, as well as the speed and total distance traveled by the animal during the 60 s of the test. The reduction in the latency and the path to find the platform in the acquisition phase in the test group compared to the control group, which received scopolamine, indicates the learning of animals, while the shortening of the latency of finding the platform site on the seventh day indicates better ability to recall the memory trace.

Test Results

The effect of compound JT-3 on memory processes in the acquisition attempt

In the Morris water maze, in the acquisition attempt (days 1-6), analysis of variance with repeated measures showed a statistically significant effect of substance administration ($F[2,132]=136.5$, $p<0.0001$); a statistically significant effect of the trial day on the platform discovery latency was also demonstrated ($F[5.132]=18.06$, $p<0.0001$). The compound x trial day interaction was statistically significant ($F[10.132]= 1.967$, $p<0.05$).

In the acquisition attempt, post hoc analysis (Dunnett's test) showed a statistically significant difference in latency to find the hidden platform between the control group that received scopolamine and the group that received scopolamine and JT-3 at a dose of 10 mg/kg on a fifth day of the test (p<0.01) (FIG. 2).

The Effect of Compound JT-3 on Memory Processes in the Recall Phase

During the seventh day of the test (recall attempt, without administration of scopolamine and JT-3), the time spent in the NW zone, the number of crossings of the place where the hidden platform was in the acquisition phase, the total distance, the distance traveled in the target zone (NW), time to the first entry into the target zone and the number of sails into this zone were measured. The JT-3 compound did not affect any of the parameters studied (FIG. 3).

Figure 3:
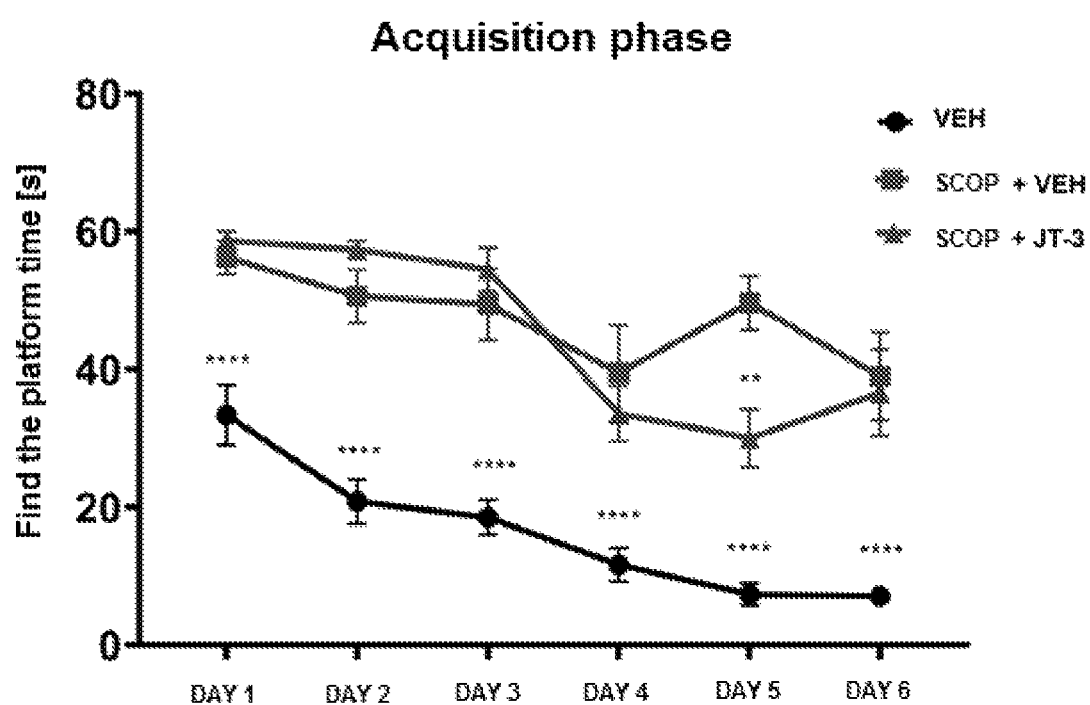

FIG. 3 shows the effect of JT-3 on learning in the acquisition phase of the Morris Water Maze Test. The results are presented as the mean platform discovery latency [s]±SEM. Statistical analysis: analysis of variance with repeated measures and Dunnett's post hoc test. Statistical significance in relation to the control group, which received scopolamine:  p<0.01, ** p<0.0001.

Figure 4:
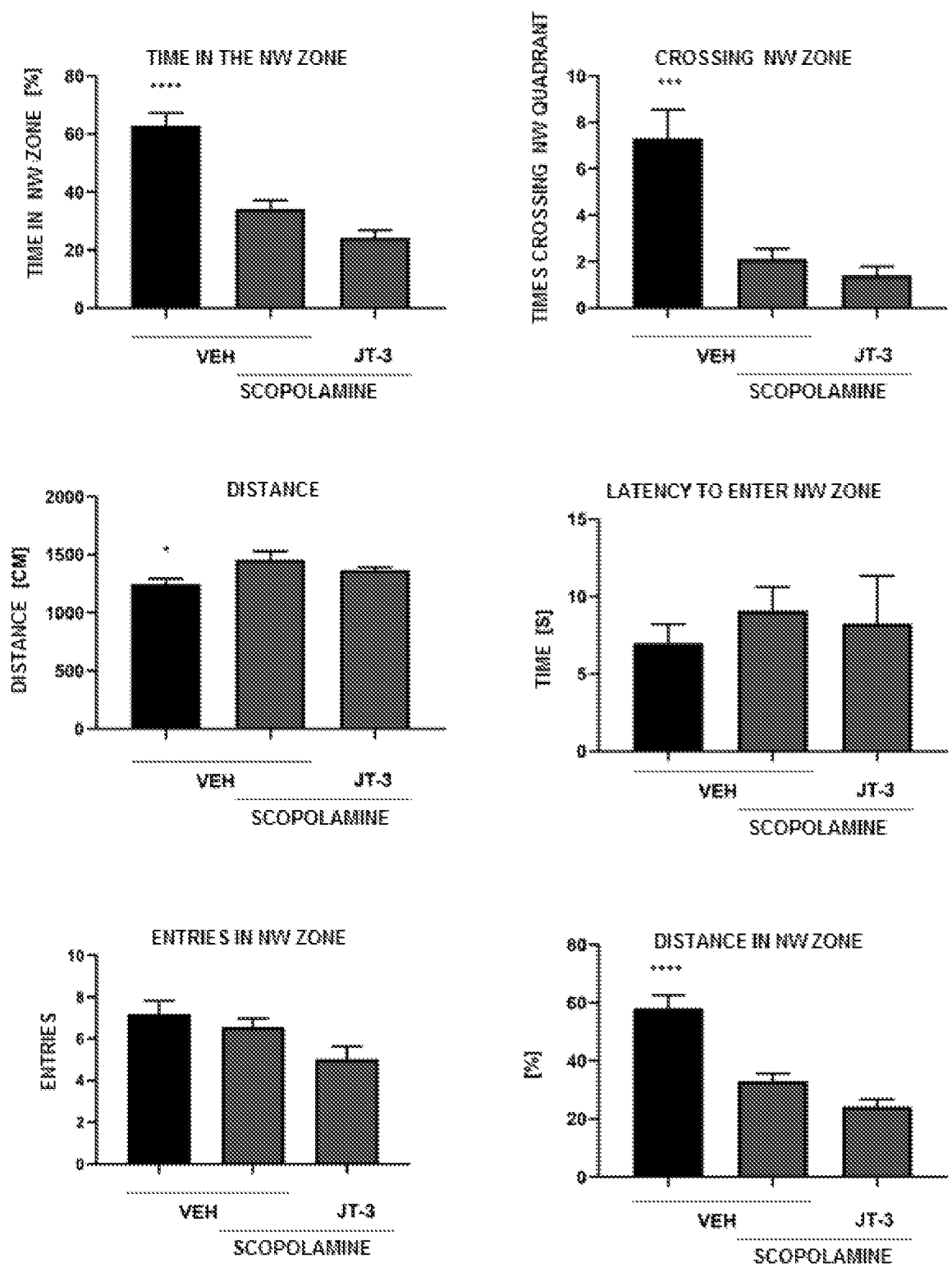

FIG. 4 shows the effect of compound JT-3 on the recall of memory traces on day 7 in the Morris water maze test. The results are presented as the mean time in the NW zone [%]±SEM, the mean number of passes through the place where the platform was on days 1-6±SEM, the mean total distance [cm]±SEM, the mean time to enter the zone NW [s]±SEM, mean number of sails into the NW zone±SEM, mean distance in the NW zone [%]±SEM. Statistical analysis: one-way ANOVA and Dunnett's post hoc test. Statistical significance in relation to the control group, which received scopolamine on days 1-6: *—p<0.05, *—p<0.001, **—p<0.0001.

Example 4.3. Barnes Maze Test

Test Procedure

The test is used to study spatial (hippocampal-dependent) memory. Unlike the water maze test, the Morris does not use the additional stressors of water and forced swimming. Barnes' maze has 18 escape holes (escape points) evenly spaced on the outer edges of the circular platform, and only one of them leads to so-called escape box, where the mouse can hide. For the first four days (acquisition phase), the mouse was placed in the center of the maze in the starting chamber, the light was turned on, then the chamber was raised and time was started. The number of errors was also counted, i.e. how many holes the mouse approached before approaching the right hole for the first time, and the total number of errors until it entered the escape box. If the mouse did not enter the escape box after 180 s, it was guided there by the experimenter. Each mouse was subjected to four trials a day.

On the fifth day, which is the recall phase (without administration of compounds), the box was removed from the escape hole and the total errors, the number of errors made up to the first approach of the mouse to the hole where the escape box was previously found and the latency to the first approach of the mouse were counted for 90 seconds to that hole were counted. The number of approaches to this hole and the time the mouse spent on it were also counted. On the twelfth day—"proper test" (without administration of compounds), the effect of the compound on long-term memory was assessed. The experiment was as in the recall phase; the same parameters were measured. Between the fifth and twelfth days, the animals were kept in home cages.

Test Results

The effect of compound JT-3 on the learning process in the acquisition phase

In Barnes's maze, in the acquisition attempt (days 1-4), analysis of variance with repeated measures showed a statistically significant treatment effect on the latency to find the escape site (F[2.96]=14.83, p<0.0001); a statistically significant effect of the trial day on the latency of finding this site was also demonstrated (F[3.96]=3.118, p<0.05). The interaction was statistically significant (F[6.96]=2.274, p<0.05). Post hoc analysis (Dunnett's test) showed statistically significant differences in the latency to find the escape site between the control group that did not receive scopolamine and the control group that received scopolamine on days three (p<0.05) and fourth (p<0.01) of the test. Statistically significant differences were also observed between the group that received scopolamine and JT-3 at a dose of 10 mg/kg and the control group that received scopolamine on the fourth day of the test (p<0.05).

In this trial, the analysis of variance with repeated measures showed a statistically significant treatment effect on the number of errors made before finding the escape site (F[2.93]=7.653, p<0.001). Moreover, a statistically significant effect of the trial day on the number of errors made before finding this place was demonstrated (F[3.93]=4.021, p<0.01). The interaction was not statistically significant (F[6.93]=1.334, p=0.25). Post hoc analysis (Dunnett's test) showed no statistically significant differences in the number of errors made before finding the escape site between the control group and the control group that received scopolamine and the group that received scopolamine and JT-3 at a dose of 10 mg/kg (FIGS. 5 and 6).

Figure 5:
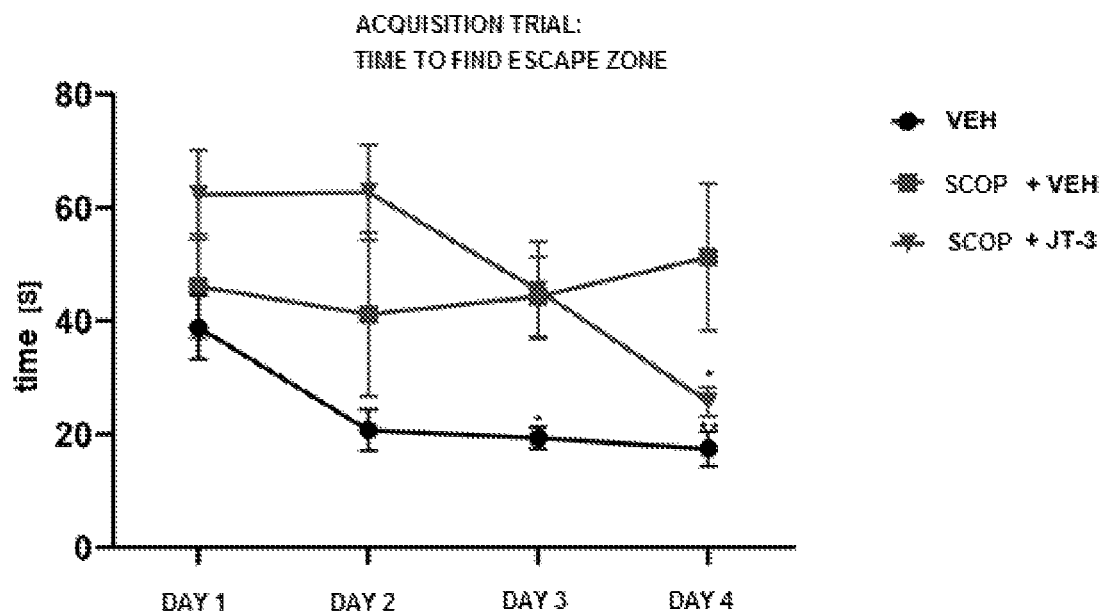

FIG. 5 shows the effect of compound JT-3 on learning in the Barnes maze test in acquisition phase. The results are presented as the mean latency to find the escape site [s]±SEM. Statistical analysis: analysis of variance with repeated measures and Dunnett's post hoc analysis. Statistical significance in relation to the control group, which received scopolamine: * p<0.05, ** p<0.01.

Figure 6:
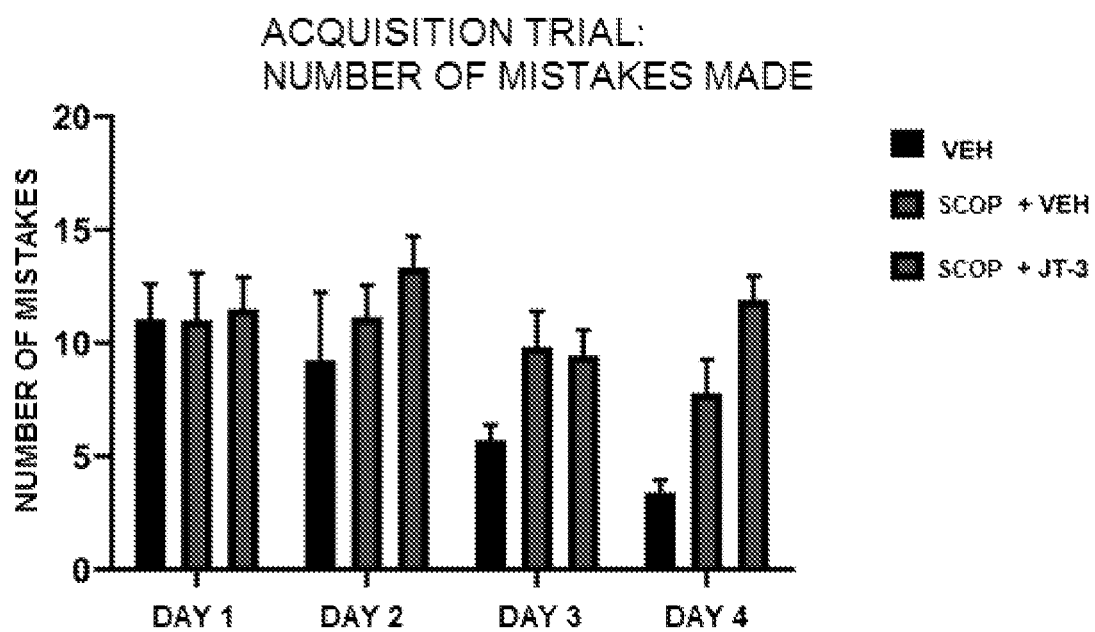

FIG. 6 shows the effect of compound JT-3 on the number of mistakes made before reaching the target zone in the Barnes maze in acquisition phase. Results are presented as the mean number of errors made before reaching the target zone±SEM on days 1-4 of the test. Statistical analysis: analysis of variance with repeated measures and Dunnett's post hoc test: p>0.05.

Effect of Compound JT-3 on Recall Phase—Day 5 and Day 12

On the fifth day (without administration of compound), the one-way analysis of variance showed a statistically significant difference between the groups for the latency time to find the place where the escape zone had previously been (F[2.21]=3.315, p=0.0561), but not for the number of mistakes made before finding this zone (F[2.23]=1.901, p=0.1722). Post hoc analysis of the results for the fifth day showed statistically significant differences between the control group and the control group that received scopolamine on days 1-4 in the latency to find the escape zone (p<0.05). Compound JT-3 was not active on the fifth day.

On the twelfth day, one-way analysis of variance showed a statistically significant effect of compound JT-3 at a dose of 10 mg/kg on both latency (F[2.24]=6.928, p<0.01) and the number of errors made before reaching the target zone (F[2.22]=23.60, p<0.0001).

Post hoc analysis of the results for the twelfth day showed a statistically significant reduction in the latency to find the escape zone in the control group compared to the control group that received scopolamine on days 1-4 (p<0.01). In the group administered JT-3 and scopolamine, the reduction in latency was also statistically significant compared to the control group that received scopolamine (p<0.05).

Post hoc analysis of the results for the twelfth day showed a statistically significant reduction in the number of errors made to find the escape zone in the control group compared to the control group receiving scopolamine (p<0.0001). In addition, in the group administered the test compound JT-3 at a dose of 10 mg/kg and scopolamine, the reduction in errors was also statistically significant compared to the control group that received scopolamine (p<0.0001) (FIG. 7).

Figure 7:
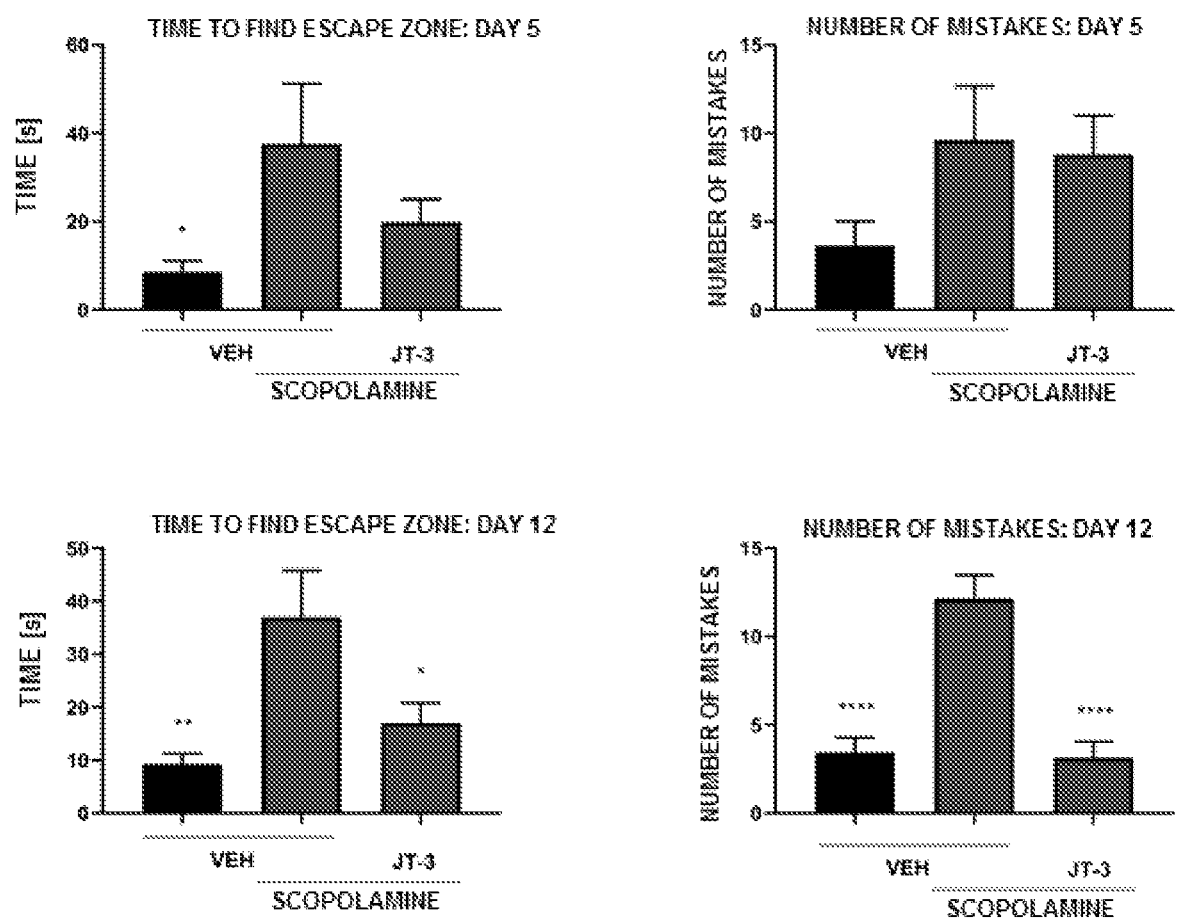

FIG. 7 shows the effect of compound JT-3 on the recall of memory traces in the Barnes maze test on days five and twelve of the test. Results are presented as mean latency to find the escape zone [s]±SEM on days five and twelve and mean errors committed±SEM on days five and twelve. Statistical analysis: one-way ANOVA and Dunnett's post hoc test. Statistical significance in relation to the control group, which received scopolamine on days 1-4: * p<0.05,  p<0.01, ** p<0.0001.

Example 4.4. Spontaneous Motor Activity Test

Test Procedure

In this test, the effect of compound JT-3 on the spontaneous motor activity of mice was investigated. The experiment was carried out in actometers (40 cm×40 cm×30 cm cages), which are equipped with photocells with a pulse sensor. The apparatus recorded the number of horizontal and vertical movements during the 60-minute test. The mice were put into the actometer, the measurement lasted for 1 hour, during which the camera counted the number of times the light beams were crossed, i.e. motor activity. 60 min before the start of the study, the mice were intraperitoneally administered compound JT-3 at a dose of 10 mg/kg. Control mice were given a 1% solution of Tween 80. During the measurement, the influence of external factors on the motor activity of the mice (noise, presence of people in the same room) was minimized.

Test Results

For compound JT-3, the spontaneous motor activity test was performed at two doses—10 mg/kg, which was used for the other tests, and 30 mg/kg, which was also tested in the passive avoidance test. Neither of these doses affected the motility of the animals (F[2.13]=2.220, p=0.15), however, at the higher dose, the number of mice movements was lower than at the lower dose. These differences did not reach statistical significance (FIG. 8).

Figure 8:
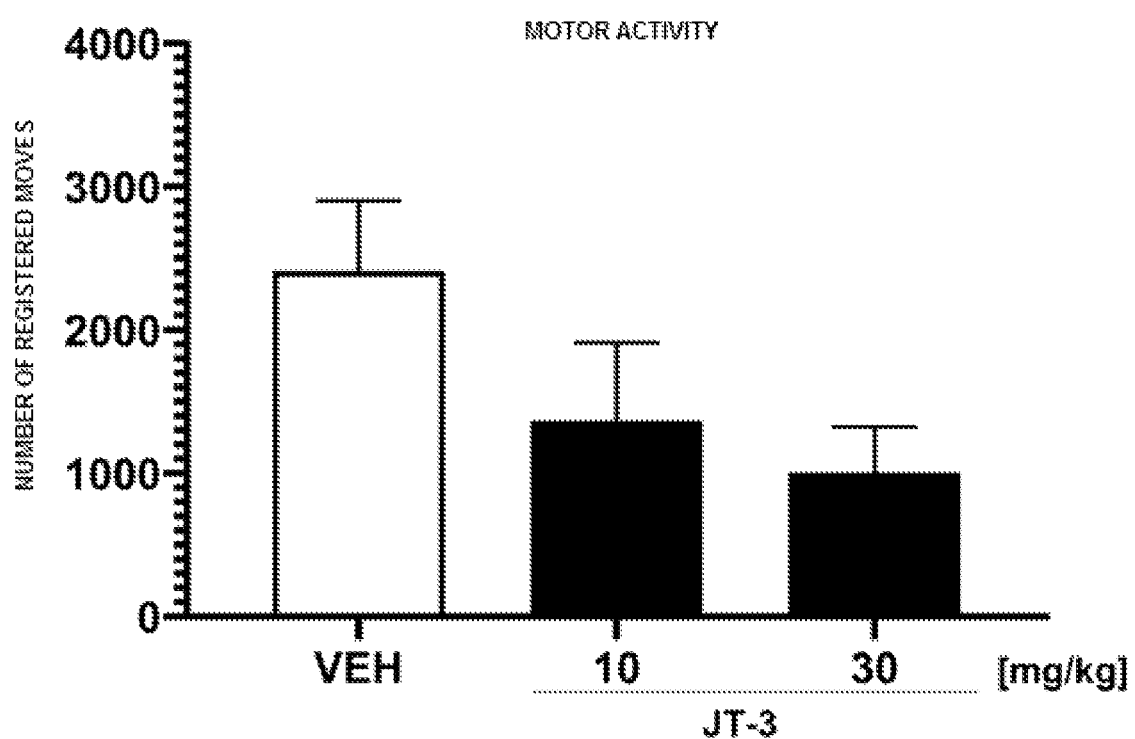

FIG. 8 shows the effect of JT-3 on spontaneous motor activity in mice. Results are presented as the mean number of movements±SEM made by the mice during the 60 min of the test. Statistical analysis: one-way ANOVA and Dunnett's post hoc test: p>0.05.

Example 4.5. Rotarod Test

Test Procedure

Before the experiment, the mice were adequately trained (3 days, rod revolving at 18 rpm). The device consists of a rod set in a horizontal position. It is 75 cm long, divided into 4 tracks, and is set in rotation by an electric motor. This metal rod is placed 50 cm above the table to discourage mice from jumping off it. On the day of the actual test, 24 h after the animals' last training, the mice were placed sequentially on the bar for 60 s (for each rotation speed). The rod rotation speed was set to 6, 18, and 24 rpm, respectively. The inability of the mice to stay on the rod for 60 s was considered a disorder of motor coordination.

Test Result

The effect of compound JT-3 administered at 10 mg/kg and 30 mg/kg on the motor coordination of mice was evaluated in the rotating rod test. No negative influence of the tested doses of compound JT-3 on the motor coordination of animals was found. All animals were kept on the bar for 60 s at speeds of 6, 18, and 24 rpm.

BIBLIOGRAPHY

G. L. Ellman, K. D. Courtney, V. Andres Jr., R. M. Featherstone, A new and rapid colorimetric determination of acetylcholinesterase activity. Biochemical pharmacology, 1961, 7.2: 88-95.

R Vassar, B D Bennett, S Babu-Khan, S Kahn, E A Mendiaz, P Denis, D. B. Teplow, S. Ross, P. Amarante, R. Loeloff, Y. Luo, S. Fisher, J. Fuller, S. Edenson, J. Lile, M. A. Jarosinski, A. L. Biere, E. Curran, T. Burgess, J. C. Louis, F. Collins, J. Treanor, G. Rogers, M. Citron, β-Secretase cleavage of Alzheimer's amyloid precursor protein by the transmembrane aspartic protease BACE. science, 1999, 286.5440: 735-741.

Stachel, Shawn J., et al. Structure-based design of potent and selective cell-permeable inhibitors of human β-secretase (BACE-1). Journal of medicinal chemistry, 2004, 47.26: 6447-6450.

Levine III, H. Solution beta-amyloid peptides: detection of amyloid aggregation in thioflavine T interaction with synthetic Alzheimer's disease. Protein Sci., 1993, 2: 404-410.

A. Kragler, G. Höfner, K. T. Wanner, Novel parent structures for inhibitors of the murine GABA transporters mGAT3 and mGAT4, Eur. J. Pharmacol. 519 (2005) 43-47.

J. Misik, E. Nepovimova, J. Pejchal, J. Kassa, J. Korabecny, O. Soukup, Cholinesterase Inhibitor 6-Chlorotacrine—In Vivo Toxicological Profile and Behavioural Effects, Curr. Alzheimer Res. 15 (2017) 552-560.

K. L. Chapman, H. Holzgrefe, L. E. Black, M. Brown, G. Chellman, C. Copeman, J. Couch, S. Creton, S. Gehen, A. Hoberman, L. B. Kinter, S. Madden, C. Mattis, H. A. Stemple, S. Wilson, Pharmaceutical toxicology: Designing studies to reduce animal use, while maximizing human translation, Regul. Toxicol. Pharmacol. 66 (2013) 88-103.

J. Pejchal, J. Novotný, V. Mařák, J. Österreicher, A. Tichý, J. Vávrová, Z. Šinkorová, L. Zárybnická, E. Novotná, J. Chládek, A. Babicová, K. Kubelková, K. Kuča, Activation of p38 MAPK and expression of TGF-β1 in rat colon enterocytes after whole body γ-irradiation, Int. J. Radiat. Biol. 88 (2012) 348-358.

Research, C. for D. E. and. Bioanalytical Method Validation Guidance for Industry http://www.fda.gov/regulatory-information/search-fda-guidance-documents/bioanalytical-method-validation-guidance-industry (accessed Jan. 3, 2020). https://www.fda.gov/downloads/Drugs/Guidance/ucm070107.pdf.

Anonymous. Bioanalytical method validation https://www.ema.europa.eu/en/bioanalytical-method-validation (accessed Jan. 3, 2020).

The invention claimed is:
1. A compound of formula I:

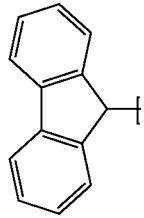

formula I where:
n is an integer with value 0 or 1,
m is an integer with value 0 or 1,
$R_1$ is H or $CH_3$,
$R_2$ is H or $CH_3$,
$R_3$ is H, $CH_3$, $CF_3$, tert-butyl, cyclopropyl, cyclohexyl or:

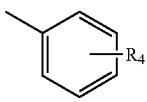

group, where $R_4$ is: H, 2-, 3- or 4-$OCH_3$, 2-, 3- or 4-$CF_3$, 2-, 3- or 4-isopropyl, or tert-butyl,
or a pharmaceutically acceptable salt thereof.

2. The compound according to claim 1, that is a compound of formula II:

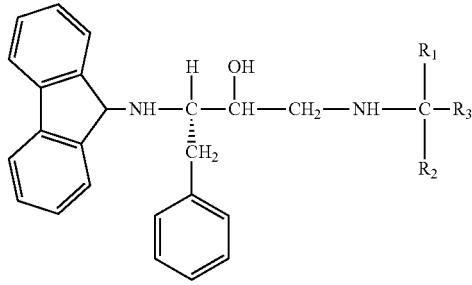

formula II where
$R_1$, $R_2$ and $R_3$ are defined in claim 1.

3. The compound according to claim 1, selected from the group consisting of:
(2R,3S)-3-((9H-fluoren-9-yl)amino)-1-(benzylamino)-4-phenylbutan-2-ol,
(2S,3S)-3-((9H-fluoren-9-yl)amino)-1-(benzylamino)-4-phenylbutan-2-ol,
(2R,3S)-3-((9H-fluoren-9-yl)amino)-1-((3-(tert-butyl)benzyl)amino)-4-phenylbutan-2-ol,
(2R,3S)-3-((9H-fluoren-9-yl)amino)-1-((3-isopropylbenzyl)amino)-4-phenylbutan-2-ol,
(2S,3S)-3-((9H-fluoren-9-yl)amino)-1-((4-(tert-butyl)benzyl)amino)-4-phenylbutan-2-ol,
(2S,3S)-3-((9H-fluoren-9-yl)amino)-1-((3-methoxybenzyl)amino)-4-phenylbutan-2-ol,
(2S,3S)-3-((9H-fluoren-9-yl)amino)-1-((2-methoxybenzyl)amino)-4-phenylbutan-2-ol,
(2R,3S)-3-((9H-fluoren-9-yl)amino)-4-phenyl-1-((3-(trifluoromethyl)benzyl)amino)-butan-2-ol,
(2R,3S)-3-((9H-fluoren-9-yl)amino)-4-phenyl-1-(((S)-1-phenylethyl)amino) butan-2-ol,
(2R,3S)-3-((9H-fluoren-9-yl)amino)-4-phenyl-1-((2-phenylpropan-2-yl)amino) butan-2-ol,
(2S,3S)-3-((9H-fluoren-9-yl)amino)-1-((cyclohexylmethyl)amino)-4-phenylbutan-2-ol,
(2S,3S)-3-((9H-fluoren-9-yl)amino)-1-(tert-butylamino)-4-phenylbutan-2-ol,
(2R,3S)-3-((9H-fluoren-9-yl)amino)-1-(neopentylamino)-4-phenylbutan-2-ol,
(2R,3S)-3-((9H-fluoren-9-yl)amino)-4-phenyl-1-((2,2,2-trifluoroethyl)amino) butan-2-ol,
(2S,3S)-3-((9H-fluoren-9-yl)amino)-1-((cyclopropylmethyl)amino)-4-phenylbutan-2-ol,
(2R,3S)-3-((9H-fluoren-9-yl)amino)-1-((cyclopropylmethyl)amino)-4-phenylbutan-2-ol,
N-((2S,3S)-4-(benzylamino)-3-hydroxy-1-phenylbutan-2-yl)-2-(9H-fluoren-9-yl) acetamide,
N-((2S,3S)-4-((4-(tert-butyl)benzyl)amino)-3-hydroxy-1-phenylbutan-2-yl)-9H-fluorene-9-carboxamide,
N-((2S,3S)-4-((4-(tert-butyl)benzyl)amino)-3-hydroxy-1-phenylbutan-2-yl)-2-(9H-fluoren-9-yl) acetamide,
2-(9H-fluoren-9-yl)-N-((2S,3S)-3-hydroxy-4-((2-methoxybenzyl)amino)-1-phenylbutan-2-yl) acetamide,
2-(9H-fluoren-9-yl)-N-((2S,3R)-3-hydroxy-1-phenyl-4-((3-(trifluoromethyl)benzyl)-amino) butan-2-yl) acetamide,
N-((2S,3R)-3-hydroxy-1-phenyl-4-(((S)-1-phenylethyl)amino) butan-2-yl)-9H-fluorene-9-carboxamide,
2-(9H-fluoren-9-yl)-N-((2S,3R)-3-hydroxy-1-phenyl-4-(((S)-1-phenylethyl)amino) butan-2-yl) acetamide,
N-((2S,3R)-3-hydroxy-1-phenyl-4-((2-phenylpropan-2-yl)amino) butan-2-yl)-9H-fluorene-9-carboxamide,
2-(9H-fluoren-9-yl)-N-((2S,3R)-3-hydroxy-1-phenyl-4-((2-phenylpropan-2-yl)amino)-butan-2-yl) acetamide,
N-((2S,3R)-3-hydroxy-4-(neopentylamino)-1-phenylbutan-2-yl)-9H-fluorene-9-carboxamide,
2-(9H-fluoren-9-yl)-N-((2S,3R)-3-hydroxy-4-(neopentylamino)-1-phenylbutan-2-yl) acetamide and
N-((2S,3R)-4-((cyclopropylmethyl)amino)-3-hydroxy-1-phenylbutan-2-yl)-2-(9H-fluoren-9-yl) acetamide.

4. A method comprising administering the compound of claim 1 to a human subject.

5. A method comprising administering the compound of claim 1 to a person with Alzheimer's disease.

6. A method comprising administering the compound of claim 3 to a human subject.

7. A method comprising administering the compound of claim 3 to a person with Alzheimer's disease.

8. A method for simultaneously inhibiting butyrylcholinesterase and β-secretase comprising administering the compound of claim 1 to a human subject.

* * * * *